3,758,454
LINCOMYCIN-TYPE COMPOUNDS AND PROCESS
FOR MAKING THEM
Alexander D. Argoudelis and Barney J. Magerlein, Portage, Mich., assignors to The Upjohn Company, Kalamazoo, Mich.
No Drawing. Filed Mar. 12, 1971, Ser. No. 123,891
Int. Cl. C07c 47/18
U.S. Cl. 260—210 R    20 Claims

ABSTRACT OF THE DISCLOSURE

A 1'-demethyllincomycin-type compound is reacted with an aldehyde to form an antibacterially active alkyl 6 - deamino - 6-(tetrahydro-1-oxo-pyrrolo-imidazolyl)-α-thiolincosaminide of the formula

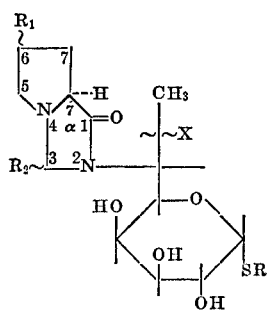

I where R, $R_1$ and X are radicals of the 1'-demethyllincomycin-type compound and $R_2$ is the radical of the aldehyde.

BRIEF DESCRIPTION OF THE INVENTION

This invention relates to a novel process for making derivatives of N-demethyllincomycin-type compounds and to certain novel compounds produced by this process. More particularly it involves a process for making alkyl 6 - deamino - 6 - (tetrahydro-1-oxo-pyrrolo-imidazolyl)-α-thiolincosaminides of the formula

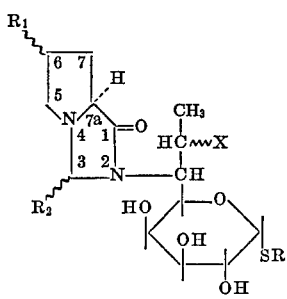

I wherein X is chlorine, bromine, iodine, hydroxy, loweralkoxy, hydroxyloweralkoxy, sulfhydryl, lower-alkylthio, hydroxyloweralkylthio; or an aromatic benzenoid hydrocarbonthio radical substituted by zero through 3 hydroxy, halo, nitro, dialkylamino groups containing in all not more than 12 carbon atoms; R is alkyl of one to 4 carbon atoms, inclusive; or a radical of the formula

—CH$_2$CH$_2$—OR$_3$ wherein $R_3$ is hydrogen or alkyl of one to 4 carbon atoms, inclusive; $R_1$ is hydrogen or lower-alkyl; and $R_2$ is an aliphatic or cycloaliphatic hydrocarbon radical having from zero through three valences satisfied by halogen, alkoxy, alkenyloxy, alkylthio, alkenylthio, hydroxy, nitro, epoxy, epoxyalkoxy, alkanoyloxy, dialkylamino, carboxy, or carbalkoxy, and containing in all not more than 18 carbon atoms; or an aromatic hydrocarbon radical of the benzene series having from zero through three valences satisfied by hydroxy, alkoxy, alkanoyloxy, benzyloxy, phenoxy, tolyoxy, halogen, nitro, mercapto, alkylthio, amino, alkylamino, dialkylamino, or methylene dioxy and containing in all not more than 18 carbon atoms; or a hydrocarbon radical containing a heterocycle of the group furan, thiophene, pyridine, and indole having zero to three substituents of the group hydroxy, alkoxy, alkanoyloxy, benzyloxy, phenoxy, alkoxyphenyl, alkoxybenzyl, mercapto, alkylthio, phenylthio, benzylthio, halogen, nitro, amino, alkylamino, dialkylamino, carboxy, and carbalkoxy and containing in all not more than 18 carbon atoms; in which an N-demethyllincomycin-type compound of the formula

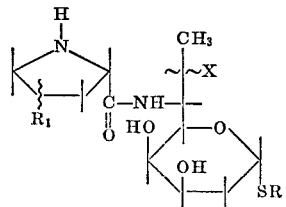

II wherein R, $R_1$ and X are as given above is reacted under non-acid conditions with an aldehyde of the formula $R_2$CHO wherein $R_2$ is as given above.

The novel compounds of the invention (Formula I) have antibacterial properties like lincomycin and can be used like lincomycin to control susceptible bacterial.

DETAILED DESCRIPTION OF THE INVENTION

The starting compounds of Formula II where X is hydrogen, chlorine, bromine, or iodine are known in the art. See U.S. Pats. 3,380,992, and 3,496,163.

Starting compounds of Formula II where X is loweralkoxy or hydroxylloweralkoxy are best prepared by reacting a compound of the formula

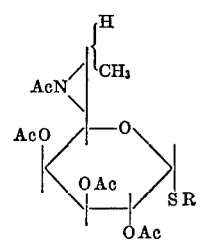

wherein R is as above an Ac is acetyl with an alcohol in the presence of acetic acid. The reaction proceeds readily with gentle heating, for example, at the reflux temperature. The acetyl groups are then removed by hydrazinolysis in a manner already known in the art and the resulting alkyl 7-O-substituted -α-thiolincosaminide is then acylated in the appropriate L-2-pyrrolidinecarboxylic acid by procedures already known in the art.

When X is loweralkylthio or hydroxyloweralkylthio, the alcohol in the above reaction is substituted by a sulfide, for example, methyl sulfide or 2-hydroxyethyl methyl sulfide. Aromatic sulfides, for example, phenyl sulfide, benzyl sulfide, with zero through three substituents as listed above also form 7(S)-substituted-α-thiolincosaminides. These 7(S)-substituted-α-thiolincosaminides are converted to antibacterially active compounds by N-acylation with an L-2-pyrrolidinecarboxylic acid as above.

The starting aldehydes $R_2CHO$ are known in the art. The process is broadly applicable to any aldehyde and antibiotically active compounds are obtained independently of the specific character of the aldehyde. Some aldehydes give compounds with more lincomycin-like activity, others give compounds with less. The reaction, however, appears to be a general one and proceeds with any aldehyde and therewith give antibacterially active compounds having lincomycin-type activity.

Thus the aldehyde can be any aliphatic, saturated or unsaturated; cycloaliphatic, saturated or unsaturated; aromatic; or heterocyclic aldehyde; provided only that $R_2$ is a radical that is nonreactive with the N-demethyllincomycin-type starting compound of Formula I.

Novel compounds, having lincomycin-like activity to a greater or lesser degree, which can be used like lincomycin to control susceptible bacteria, are obtained when X, R, and $R_1$ are as given above and $R_2$ is hydrogen or methyl, ethyl, propyl, butyl, pentyl, hexyl, heptyl, octyl, nonyl, decyl, undecyl, dodecyl, tridecyl, tetradecyl pentadecyl, hexadecyl, heptadecyl, octadecyl, and the isomeric forms thereof; bromochloromethyl, butoxymethyl, butylthiomethyl, tert.butylthiomethyl, chlorodifluoromethyl, cyclohexadienylmethyl, cyclohexylmethyl, cyclohexylidenemethyl, cyclopentylmethyl, cyclopentenylmethyl, cyclopentylidenemethyl, dibromomethyl, dichloromethyl, diethylaminomethyl, dihydroxymethyl, diisopropylaminomethyl, dimethylaminomethyl, ethoxymethyl, fluoromethyl, hydroxymethyl, iodomethyl, methoxymethyl, methylthiomethyl, nitromethyl, propylthiomethyl, tribromomethyl, trichloromethyl, trifluoromethyl, and triiodomethyl, 2-allyloxyethyl, 2-allyloxy-1,1-dimethylethyl,
1-(allylthio)ethyl,
2-amino-1-hydroxyethyl,
2-bromoethyl,
2-bromo-2,2-difluoroethyl,
2-bromo-1,1-dimethylethyl,
1-bromo-2-ethoxyethyl,
1-bromo-2-methoxyethyl,
1-bromo-1-methylethyl,
2-butoxyethyl,
2-tert-butoxy-1-chloro-1-methylethyl,
2-(butylamino)-1,1-dimethylethyl,
1-(tert.butylamino)-1-methylethyl,
1-chloroethyl,
2-chloroethyl,
2-chloro-1,1-dimethylethyl,
1-chloro-2-ethoxyethyl,
1-chloro-2-methoxyethyl,
1-chloro-2-methoxy-1-methylethyl,
1-chloro-1-methylethyl,
1,2-dibromoethyl,
2-dibutylamino-1,1-dimethylethyl,
1,1-dimethylethyl,
1,1-dichloroethyl,
1,2-dichloroethyl,
2,2-dichloroethyl,
2,2-dichloro-1-methoxyethyl,
2,2-diethoxyethyl,
2,2-diethoxy-1,1-dimethylethyl,
2,2-diethoxy-1-methylethyl,
2-(diethylamino)ethyl,
2-(diethylamino)-1,1-dimethylethyl,
1-(diethylamino)-1-methylethyl,
2-(diethylamino)-1-methylethyl,
1,2-dihydroxyethyl (from glyceraldehyde),
1,2-dimethoxyethyl,
1-(dimethylamino)ethyl,
2-(dimethylamino)ethyl,
2-(dimethylamino)-1,1-dimethylethyl,
1-(dimethylamino)-1-methylethyl, 1,1-di(methylthio)ethyl,
1,2-dinitroethyl,
2,2-dinitroethyl,
1,2-epoxyethyl,
2-(1,2-epoxypropoxy)ethyl,
2-(2,3-epoxypropoxy)ethyl,
2-ethoxyethyl,
2-ethoxy-1,1-dimethylethyl,
1-ethoxy-1-methylethyl,
1-(ethylthio)-1-methylethyl,
2-(ethylthio)-1-methylethyl,
1-fluoroethyl,
1-fluoro-1-methylethyl,
2-hydroxyethyl,
1-hydroxy-1-methylethyl,
2-isobutoxy-1,1-dimethylethyl,
2-isobutoxy-1-methyl-1-nitroethyl,
2-isopropoxy-1,1-dimethylethyl,
2-isobutoxy-1-methyl-1-nitroethyl,
2-isopropoxy-1,1-dimethylethyl,
1-(isopropylthio)-1-methylethyl,
1-methoxyethyl,
2-methoxyethyl,
2-methoxy-1,1-dimethylethyl,
1-methoxy-1-methylethyl,
2-methoxy-1-methylethyl,
1-methoxy-1-nitroethyl,
1-methyl-1-methylthioethyl,
1-methyl-2-methylthioethyl,
1-methyl-1-nitroethyl,
1-methyl-2-nitroethyl,
1-(methylthio)ethyl,
2-(methylthio)ethyl,
2-propoxyethyl,
2-(propylthio)ethyl,
2,2,2-trichloroethyl,
2,2,2-trifluoroethyl,
1,2,2-trinitroethyl, and
2-(vinyloxy)ethyl;
1-[(allyloxy)methyl]-1-(isobutoxymethylpropyl),
1,1-bis(hydroxymethyl)propyl,
2,3-bis(methylthio)propyl,
1-bromopropyl,
2-bromopropyl,
1-bromo-2-butoxypropyl,
1-bromo-2,2-dimethylpropyl,
1-bromo-1-ethoxypropyl,
1-bromo-2-ethoxypropyl,
1-bromo-2-methylpropyl,
3-butoxypropyl,
2-butoxy-3-hydroxypropyl,
1-butoxy-1-methylpropyl,
2-butoxy-2-methylpropyl,
2-(butylthio)propyl,
1-chloropropyl,
2-chloropropyl,
3-chloropropyl,
1-chloro-2-ethoxypropyl,
1-chloro-3-hydroxypropyl,
2-chloro-1-hydroxypropyl,
1-chloro-1,2,2-trimethylpropyl,
1,1-dibromopropyl,
2,3-dibromopropyl,
2,3-dichloropropyl,
3,3-dichloropropyl,
1,1-dichloro-2,2-dimethylpropyl,
1,3-dichloro-2-ethoxypropyl,
1,3-dichloro-2-methoxypropyl,
1-diethylaminopropyl,
1-[(diethylamino)methyl]propyl,
1-[(diethylamino)methyl]-2-methylpropyl,
2,2-diethoxypropyl,
2,3-diethoxy-2-hydroxypropyl,
1,2-dihydroxypropyl,
1,3-dihydroxypropyl, 2,3-dihydroxypropyl,
3,3-dihydroxypropyl,
1,3-dihydroxy-2,2-dimethylpropyl,
1,3-dihydroxy-2-methylpropyl,
2-dimethylaminopropyl,
1,2-epoxypropyl,
2,3-epoxypropyl,
1,2-epoxy-1-methylpropyl,
1,2-epoxy-2-methylpropyl,
2,3-epoxy-1-methylpropyl,
2,3-epoxy-2-methylpropyl,
2-ethoxypropyl,
1-ethoxypropyl,
2-ethoxy-1-methylpropyl,
2-ethoxy-1,1-dimethylpropyl,
2-ethoxy-2-methylpropyl,
1-ethoxy-1-ethylpropyl,
2-ethoxy-1-hydroxypropyl,
2-ethoxy-1-hydroxy-1-methylpropyl,
1-ethoxy-2-methylpropyl,
3-ethoxy-2-methylpropyl,
2-ethoxy-1-methylpropyl,
2-ethoxy-2-methylpropyl,
3-(ethoxymethyl)-3-pentyl,
1-ethyl-1-(hydroxymethyl)propyl,
1-ethyl-1-(iodomethyl)propyl,
2-(ethylthio)propyl,
3-(ethylthio)propyl,
1-ethyl-1-(methylthio)propyl,
1-fluoropropyl,
3-fluoropropyl,
1-hydroxypropyl,
2-hydroxypropyl,
3-hydroxypropyl,
2-hydroxy-1,1-dimethylpropyl,
1-(hydroxymethyl)propyl,
1-hydroxy-1-methylpropyl,
2-hydroxy-2-methylpropyl,
2-isobutoxypropyl,
2-isopropoxypropyl,
2-methoxypropyl,
2-methoxy-2-methylpropyl,
2-(methylthio)propyl,
3-(methylthio)propyl,
3-nitropropyl,
3-octylthiopropyl,
1,2,2-trichloropropyl,
1-bromo-2,4-dihydroxybutyl,
2-bromo-1,4-dihydroxybutyl,
4-dibutylaminobutyl,
1,2-dichloro-1-methylbutyl,
2,4-diethoxybutyl,
2-(dimethylaminomethyl)-1-ethyl-3-methylbutyl,
1,3-dimethyl-3-nitrobutyl,
2,3-dimethyl-3-nitrobutyl,
3,3-dinitrobutyl,
1-(1-ethoxyethyl)-4-hydroxybutyl,
1-(ethoxymethyl-3,3-dimethyl)butyl,
2-ethoxy-1,1,3-trimethylbutyl,
3-hydroxybutyl,
4-hydroxybutyl,
2-hydroxy-1,3-dimethylbutyl,
4-hydroxy-1-(2-hydroxyethyl)butyl,
4-hydroxy-3-(hydroxymethyl)butyl,
4-hydroxy-1-(3-hydroxypropyl)butyl,
2-hydroxy-1-methylbutyl,
4-hydroxy-2-methylbutyl,
2-(hydroxymethyl)-1-propylbutyl,
2-hydroxy-1,1,3-trimethylbutyl,
4-methoxybutyl,
3-methyl-3-nitrobutyl,
3-nitrobutyl,
4,4,4-trichlorobutyl,
1-butoxypentyl,
2-butoxy-1-ethylpentyl,
1-chloropentyl,
1,2-dibromo-1-ethylpentyl,
2,4-dibutoxypentyl,
5-dibutylaminopentyl,
1,2-dichloro-1-ethylpentyl,
2,4-diethoxypentyl,
2,4-dimethoxypentyl,
2-ethoxypentyl,
2-ethoxy-1,3-diethylpentyl,
2-ethoxy-1-ethylpentyl,
1-(1-ethoxyethyl)-1-ethylpentyl,
1-ethyl-2-hydroxypentyl,
1-ethyl-2-mercaptopentyl,
1-ethyl-2-methoxypentyl,
1-[(hexylthio)methyl]pentyl,
2-hydroxypentyl,
4-hydroxypentyl,
5-hydroxypentyl,
2-hydroxy-2,4-demethylpentyl,
5-hydroxy-4-(hydroxylmethyl)pentyl,
2-hydroxy-1-isopropyl-4-methylpentyl,
4-hydroxy-2-methylpentyl,
4-hydroxy-4-methylpentyl,
2-methoxypentyl,
5-methoxypentyl,
1-methyl-3-nitropentyl,
2-methyl-3-nitropentyl,
3-nitropentyl,
1-bromohexyl,
1-chlorohexyl,
1,1-dibromohexyl,
1-hydroxyhexyl,
6-hydroxyhexyl,
2-hydroxy-2,5-dimethylhexyl,
4-hydroxy-5-methylhexyl,
6-methoxyhexyl,
3-carboxypropyl,
7-carbethoxyheptyl,
5-carbobutoxypentyl,
2-carboxyethyl,
carboxymethyl,
2-carboxyheptyl,
7-carbomethoxyheptyl
7-carbomethoxyheptyl (from azelaaldehydric acid methyl ester),
8-carboxyoctyl (from sebacaldehydric acid),
carboxy (from glyoxalic acid),
carboxy-2,2-dimethylmethyl
dicarboxymethyl,
2-buten-2-yl (from tigaldehyde),
vinyl (from acrolein),
propenyl (from crotonaldehyde),
isopropenyl (from methacryladehyde),
2-methylpropenyl (from 3-methylcrotonaldehyde),
1-amino-2-buten-2-yl,
1-butoxy-3-methyl-2-penten-2-yl,
1-chloro-2-penten-2-yl,
1-chloro-2-methyl-2-penten-2-yl,
1,1-dichloro-1-buten-2-yl,
3,3-dimethyl-2-hexen-2-yl,
1-ethoxy-1-buten-2-yl,
1-ethoxy-3-methyl-1-buten-2-yl,
4,4-dimethyl-2-hepten-2-yl,
3-octen-4-yl,
2-octen-3-yl,
2-hepten-2-yl,
1-hexenyl,
3-hexenyl,
4-hexenyl,
2-methyl-3-buten-2-yl,
4-methyl-3-pentenyl,
4-methyl-4-pentenyl,
2,3-dimethyl-1-pentenyl,
3,4-dimethyl-1-pentenyl, 2-hepten-2-yl,
3-ethyl-1-pentenyl,
2-methyl-3-hexen-2-yl,
1,3-dimethyl-2-penten-2-yl,
1,2-dimethyl-2-penten-2-yl,
2-octen-3-yl,
3-nonen-4-yl,
2,3,3-trimethyl-1-pentenyl,
2,5-heptadien-3-yl,
1-decenyl,
2-decenyl,
3-ethyl-4-methyl-5-hexen-3-yl,
3,5-dimethyl-5-hepten-4-yl,
4,4-dimethyl-3-methylidenehexane,
2,5-dimethyl-3-methylidenehexane,
2,4-dimethyl-3-methylidenehexane,
6-methyl-4-octen-4-yl,
2,5-dimethyl-4-hexen-2-yl,
2,6-dimethyl-5-hepten-2-yl (from citronellal),
2,6-dimethyl-6-hepten-2-yl,
4,6-dimethyl-3-hepten-2-yl,
2,6-dimethyl-1-heptenyl,
1-methyl-1-octenyl,
6-methyl-5-methylene-2-hepteyl,
2,2,5-trimethyl-3-hexenyl,
1,1,5-trimethyl-4-hepten-2-yl,
9-decenyl,
2-isobutyl-4-methyl-1-pentyl,
2-aminovinyl,
1-hepten-2-yl,
2-bromovinyl,
1-borom-2,2-dichlorovinyl,
2-bromo-2,2-dichlorovinyl,
2-bromo-1,2-dichlorovinyl,
1-bromo-2,2-diiodovinyl,
2-bromo-1-methylvinyl,
1-butyl-1-hepten-2-yl,
3,3-dimethyl-1-buten-2-yl,
2-(butylthio)vinyl,
1-chlorovinyl,
2-chlorovinyl,
1-chloro-2,2-diiodovinyl,
3-chloro-2-propen-2yl,
2,2-dibromovinyl,
1,2-dibromo-2-chlorovinyl,
2,2-dibromo-1-chlorovinyl,
2-(dibutylamino)vinyl,
2,2-dichlorovinyl,
3,3-dichloro-2-propen-2-yl,
2-diethylaminovinyl,
3-diethylamino-2-propen-2-yl,
2,2-diiodovinyl,
2-dimethylaminovinyl,
3-dimethylamino-2-propen-2-yl,
2-ethoxyvinyl,
3-ethoxy-2-propen-2-yl,
2-isobutoxyvinyl,
3-hepten-3-yl,
1-hydroxyvinyl,
2-hydroxyvinyl,
3-hydroxy-2-propen-2-yl,
2-isobutoxyvinyl
1-isopropylvinyl,
2-methoxyvinyl,
3-methoxy-2-propen-2-yl,
2-(methylthio)vinyl,
2-pentyl-1-hepten-2-yl,
tribromovinyl,
trichlorovinyl,
1-bromopropenyl,
2-bromopropenyl,
3-bromo-2-buten-2-yl,
1-chloropropenyl,
2-chloropropenyl,
1,4-dichloro-3-penten-3-yl,
4-chloro-3-penten-3-yl,
4-chloro-1-hydroxy-3-penten-3-yl,
4-chloro-2-methyl-3-penten-3-yl,
1-chloro-2-methylpropenyl,
3-chloro-2-buten-2-yl,
4-chloro-2-buten-2-yl,
1,3-dichloropropenyl,
4,4-diethoxy-2-buten-2-yl,
3,3-dimethoxypropenyl,
3-methyl-2-buten-2-yl,
3-(dimethylamino)-3-ethoxypropenyl,
4-ethoxy-2-buten-2-yl,
3-ethoxy-2-methylpropenyl,
2-penten-2-yl,
3-hydroxypropenyl,
3-hydroxy-2-buten-2-yl,
4-hydroxy-2-buten-2yl,
2-methyl-3-penten-3-yl,
2-methoxypropenyl,
3-methoxypropenyl,
4-methoxy-2-buten-2-yl,
2-buten-2-yl,
isopropenyl,
2-[(3-methyl-2-butenyyl)thio]-3-nitropropenyl,
3-nitropropenyl,
3,3,3-trichloropropenyl,
1,3-pentadien-3-yl,
cyclopropylmethyl,
2-cyclopropylvinyl,
2-cyclobutylethyl,
2-(cyclohexenyl)ethyl,
2-cyclohexylethyl,
2-cyclopentylethyl,
2-cyclopropylethyl,
3-cyclohexylpropyl,
3-cyclohexylidenepropyl,
3-cyclopentylidenepropyl,
1-(cyclopenten-1-yl)propyl,
2-cyclohexylvinyl,
2-cyclopropyl-2-methylvinyl,
cyclopropyl,
1,2-dimethylcyclopropyl,
2,2-dimethyl-3-(2-methylpropyl)cyclopropyl,
3-isobutyl-2,2-dimethylcyclopropyl,
1-methylcyclopropyl,
2-methyl-3-propenylcyclopropyl,
1-vinyl-cyclobutyl,
cyclobutyl,
2-chloro-1-cyclobutenyl,
2-(dimethylamino)-1-cyclobutenyl,
2,2-dimethyl-3-methylenecyclopentyl,
2-ethylidenecyclopentylmethyl,
2-hydroxycyclopentylmethyl,
2-hydroxycyclopentyl-2-ethyl,
2-cyclopentylethyl,
2-methylenecyclopentylmethyl,
1-vinylcyclopentylmethyl,
3-cyclopentylpropyl,
2-hydroxycyclopentyl-3-propyl, cyclopentyl,
3-tert.butylcyclopentyl,
1-(2-cyclohexylideneethyl)cyclopentyl,
1-(1,1-dimethylallyl)cyclopentyl,
2-ethyl-3-hydroxy-5-(hydroxymethyl)cyclopentyl,
2-ethyl-3-hydroxy-4-methylcyclopentyl,
2-ethyl-5-methylcyclopentyl,
2-hydroxy-2,3-dimethylcyclopentyl,
3-hydroxy-2-(2-hydroxyethyl)-5-methylcyclopentyl,
2-hydroxy-5-isopropyl-2-methylcyclopentyl,
2-isopropenyl-5-methylcyclopentyl,
3-isopropenyl-1-methylcyclopentyl,
3-isopropyl-1-methylcyclopentyl,
1-methylcyclopentyl, 1-(3-methyl-2-butenyl)cyclopentyl, and
2,3,3-trimethyl-1-cyclopenten-1-ylmethyl-;
2-cyclopenten-1-ylmethyl,
3-cyclopenten-1-ylmethyl,
2,2-dimethyl-3-cyclopenten-1-ylmethyl,
2,2,3-trimethyl-3-cyclopenten-1-ylmethyl,
2,2,4-trimethyl-3-cyclopenten-1-ylmethyl,
2-cyclopenten-1-ylpropyl,
3-(2-cyclopentenyl)-2-methylbutyl,
2-cyclopenten-1-yl-2-methylpropyl,
1-cyclopenten-1-yl,
2-bromo-1-cyclopenten-1-yl,
2-chloro-1-cyclopenten-1-yl,
2-chloro-3-[(dimethylamino)methylene]-1-cyclopenten-1-yl,
3,5-di-sec.butyl-1-cyclopenten-1-yl,
4,5-dimethyl-1-cyclopenten-1-yl,
2-(dimethylamino)-1-cyclopenten-1-yl,
5-isopropenyl-2-methyl-1-cyclopenten-1-yl,
5-isopropyl-2-methyl-1-cyclopenten-1-yl,
1-cyclopenten,
3-methyl-1-cyclopenten-1-yl,
3-cyclopenten-1-yl,
3-(2-cyclopenten-1-yl)propenyl,
4-(2-cyclopenten-1-yl)-3-methyl-2-buten-2-yl,
α,β-dimethyl- and β-methyl-2-cyclopentene-1-crotonaldehyde;
3-(2-cyclopenten-1-yl)-2-methylpropenyl,
5-[(dimethylamino)methylene]-3-cyclopentadien-1-yl,
5-(dipropyl-cyclopropen-1-ylidene)-3-cyclopentadien-1-yl,
3-cyclopentadien-1-methylpropenyl,
3-[(dimethylamino)methylene]-1,4-cyclopentadien-1-yl,
cyclohexylmethyl,
2,2-dimethyl-6-methylenecyclohexylmethyl,
1-ethoxycyclohexylmethyl,
3-ethoxy-2,2-dimethyl-6-methylenecyclohexylmethyl,
1-(2-ethylidene)cyclohexylmethyl,
2-hydroxycyclohexyl-vinyl,
2-hydroxy-4-methylcyclohexylvinyl,
3-hydroxy-4-methylcyclohexyl-vinyl,
4-hydroxy-4-methylcyclohexyl-vinyl,
2-methoxy-cyclohexylmethyl,
1-cyclohexylethyl,
2-methylcyclohexylmethyl,
2-methylenecyclohexylmethyl,
1-propenylcyclohexylmethyl,
1,3,3-trimethyl-2-methylenecyclohexylmethyl,
2,2,3-trimethyl-6-methylenecyclohexylmethyl,
1-vinyl-cyclohexylmethyl,
cyclohexylidenemethyl,
2,2-dimethylcyclohexylidenemethyl,
2-methylcyclohexylidenemethyl,
4-methylcyclohexylidenemethyl,
2,2,6-trimethylcyclohexylidenemethyl,
2-cyclohexylvinyl,
2-cyclohexylpropenyl,
2-(4-methylcyclohexyl)vinyl,
2-(3,3,5-trimethylcyclohexyl)vinyl,
3-cyclohexylpropyl,
3-cyclohexylidenepropyl,
3-cyclohexylidene-1,1-dimethylpropyl,
3-(2-methylcyclohexylidene)-1,1-dimethylpropyl,
3-(3-methylcyclohexylidene)-1,1-dimethylpropyl,
3-(4-methylcyclohexylidene)-1,1-dimethylpropyl,
1-bromocyclohexyl,
1-bromo-4-methylcyclohexyl,
1-bromo-2,2,6-trimethylcyclohexyl,
2,2,-dimethylcyclohexyl,
1-[(dimethylamino)methyl]cyclohexyl,
2-[(dimethylamino)methyl]-3,4,5-trimethylcyclohexyl,
6-[(dimethylamino)methyl]-2,3,4-trimethylcyclohexyl,
2-hydroxycyclohexyl,
1-hydroxy-4-methylcyclohexyl,
4-(hydroxy-methyl)cyclohexyl,
2-(hydroxy-methyl)-4,5-dimethylcyclohexyl,
4-(4-hydroxy-4-methylpentyl)cyclohexyl,
6-(hydroxymethyl)-2,3,4-trimethylcyclohexyl,
1-(isobutoxymethyl)cyclohexyl,
1-methoxycyclohexyl,
2-methoxycyclohexyl,
2-(methoxymethyl)-4,5-dimethylcyclohexyl,
1-methylcyclohexyl,
2-methylcyclohexyl,
4-methylcyclohexyl,
2,2,6-trimethylcyclohexyl,
2,4,6-trimethylcyclohexyl,
3,3,5-trimethylcyclohexyl,
2,2,3-trimethyl-6-methylenecyclohexyl,
3-cyclohexylpropenyl,
3-cyclohexylidenepropenyl,
3-cyclohexylidene-1-buten-1-yl,
4-cyclohexylidene-2-buten-2-yl,
6,6-dimethyl-2-cyclohexen-1-ylmethyl,
2,6,6-trimethyl-2-cyclohexen-1-ylmethyl,
3-cyclohexen-1-ylmethyl,
2-(4-methyl-3-cyclohexen-1-yl)propyl,
4-methyl-3-cyclohexen-yl-3-buten-3-yl,
1-cyclohexen-1-yl,
2-bromo-1-cyclohexen-1-yl,
2-chloro-1-cyclohexen-1-yl,
2-chloro-3-[(dimethylamino)methylene]-1-cyclohexen-1-yl,
2-chloro-5-methyl-1-cyclohexen-1-yl,
5,5-dimethyl-6-methylene-1-cyclohexen-1-yl,
2-ethoxy-1-cyclohexen-1-yl,
4-ethoxy-3,3-dimethyl-1-cyclohexen-1-yl,
4-isopropenyl-1-cyclohexen-1-yl,
4-isopropoxy-1-cyclohexene-1-yl,
2-methoxy-1-cyclohexen-1-yl,
2-methyl-1-cyclohexen-1-yl,
4-methyl-1-cyclohexen-1-yl,
2,4,4,5-tetramethyl-1-cyclohexen-1-yl,
2,4,6-trimethyl-1-cyclohexen-1-yl,
2,6,6-trimethyl-1-cyclohexen-1-yl,
3,3,4-trimethyl-1-cyclohexen-1-yl,
2,5,6,6-tetramethyl-2-cyclohexen-1-yl,
2,6,6-trimethyl-2-cyclohexen-1-yl,
3,5,5-trimethyl-2-cyclohexen-1-yl,
3-cyclohexen-1-yl,
1-allyl-3-cyclohexen-1-yl,
5-bromo-2-methyl-3-cyclohexen-1-yl,
1-chloro-2-(chloromethyl)-3-cyclohexen-1-yl,
1-[(diethylamino)methyl]-3-cyclohexen-1-yl,
3,5-diethyl-2-hydroxy-3-cyclohexen-1-yl,
3,5-diethyl-2-hydroxy-6-methyl-3-cyclohexen-1-yl,
1,4-dimethyl-3-cyclohexen-1-yl,
2,6-dimethyl-3-cyclohexene-1-yl,
4,6-dimethyl-3-cyclohexen-1-yl,
3,4-dimethyl-6-(trichloromethyl)-3-cyclohexen-1-yl,
3,4-dimethyl-6-(trifluoromethyl)-3-cyclohexene-1-yl,
2-ethoxy-4,6-dimethyl-3-cyclohexen-1-yl,
2-ethoxy-4-methyl-3-cyclohexen-1-yl,
4-(4-hydroxy-4-methylpentyl)-6-methyl-3-cyclohexen-1-yl,
1-(isobutoxymethyl)-3-cyclohexen-1-yl,
5-methoxy-2-methyl-3-cyclohexen-1-yl,
6-(methoxymethyl)-3,4-dimethyl-3-cyclohexen-1-yl,
1-methyl-3-cyclohexen-1-yl,
2-methyl-3-cyclohexen-1-yl,
4-methyl-3-cyclohexen-1-yl,
6-methyl-3-cyclohexen-1-yl,
1-methyl-4-(4-methyl-3-pentenyl)-3-cyclo-hexen-1-yl,
3-(4-methyl-3-pentenyl)-3-cyclohexen-1-yl,
4-(4-methyl-3-pentenyl)-3-cyclohexen-1-yl,
2,2,4,5,5-pentamethyl-3-cyclohexen-1-yl,
2,4,6-trimethyl-3-cyclohexen-1-yl,
2,2,4-trimethyl-3-cyclohexen-1-yl,
2,4,6-trimethyl-3-cyclohexen-1-yl, 3,4,6-trimethyl-3-cyclohexen-1-yl,
4,5,6-trimethyl-2-(2-methylpropenyl)-3-cyclohexen-1-yl,
2-vinyl-3-cyclohexen-1-yl,
3-(cyclohexen-1-yl)-2-methylpropenyl,
2,3,4,4,5,6-hexamethyl-2,5-cyclohexadien-1-ylidenemethyl,
2,6-dimethoxy-2,5-cyclohexadien-1-ylmethyl,
1-(2,6-dimethoxy-4-methyl-2,5-cyclohexadien-1-yl)ethyl,
1-(2,6-dimethoxy-2,5-cyclohexadien-1-yl)ethyl,
2,6-dimethoxy-4-methyl-2,5-cyclohexadien-1-ylmethyl,
1,3-cyclohexadien-1-yl,
3,5-diethyl-1,3-cyclohexadien-1-yl,
3,5-diethyl-6-methyl-1,3-cyclohexadien-1-yl,
3,5-dimethyl-1,3-cyclohexadien-1-yl,
4,6-dimethyl-1,3-cyclohexadien-1-yl,
4-isopropyl-1,3-cyclohexadien-1-yl,
4-methyl-1,3-cyclohexadien-1-yl,
6-methyl-1,3-cyclohexadien-1-yl,
2,6,6-trimethyl-1,3-cyclohexadien-1-yl,
3,6,6-trimethyl-1,3-cyclohexadien-1-yl,
4,6,6-trimethyl-1,3-cyclohexadien-1-yl,
4-(4-hydroxy-4-methylpentyl)-1,4-cyclohexadien-1-yl,
2-(methoxymethyl)-4,5-dimethyl-1,4-cyclohexadien-1-yl,
6-methyl-2,4-cyclohexadien-1-yl,
phenyl,
m-aminophenyl,
o-aminophenyl,
p-aminophenyl,
4-amino-2-chlorophenyl,
m-(benzyloxy)phenyl,
o-(benzyloxy)phenyl,
p-(benzyloxy)phenyl,
3-(benzyloxy)-5-bromo-4-hydroxyphenyl,
4-(benzyloxy)-2-bromo-5-methoxyphenyl,
4-(benzyloxy)-3-bromo-5-methoxyphenyl,
5-(benzyloxy)-2-bromo-4-methoxyphenyl,
2-(benzyloxy)-3,5-dimethoxyphenyl,
3-(benzyloxy)-4-hydroxyphenyl,
4-(benzyloxy)-3-hydroxyphenyl,
5-(benzyloxy)-5-hydroxy-2-methoxyphenyl,
4-(benzyloxy)-3-methoxyphenyl,
2-(benzyloxy)-3-methoxy-6-nitrophenyl,
4-(benzyloxy)-3-methoxy-2-nitrophenyl,
4-(benzyloxy)-5-methoxy-2-nitrophenyl,
4-(benzyloxy)-2-nitrophenyl,
5-(benzyloxy)-2-nitrophenyl,
o-benzylthiophenyl,
2,4-bis(benzyloxy)phenyl,
2,5-bis(benzyloxy)phenyl,
2,6-bis(benzyloxy)phenyl,
3,4-bis(benzyloxy)phenyl,
3,4-bis(benzyloxy)-2-bromophenyl,
4,5-bis(benzyloxy)-2-bromophenyl,
2,4-bis(benzyloxy)-5-methoxyphenyl,
2,5-bis(benzyloxy)-3-methoxyphenyl,
2,5-bis(benzyloxy)-4-methoxyphenyl,
4,5-bis(benzyloxy)-2-methoxyphenyl,
m-bromophenyl,
o-bromophenyl,
p-bromophenyl,
3-bromo-5-ethoxy-4-methoxyphenyl,
3-bromo-5-chloro-4-hydroxyphenyl,
2-bromo-4,5-diethoxyphenyl,
4-bromo-2,6-dimethylphenyl,
3-bromo-5-ethoxy-4-hydroxyphenyl,
3-bromo-5-ethoxy-4-methoxyphenyl,
o-(2-bromoethyl)phenyl,
p-[(2-bromoethyl)-thio]phenyl,
2-bromo-5-hydroxyphenyl,
3-bromo-4-hydroxyphenyl,
3-bromo-4-hydroxy-5-iodophenyl,
4-bromo-2-nitrophenyl,
5-bromo-2-nitrophenyl,
m-butoxyphenyl,
o-butoxyphenyl,
o-tert.butoxyphenyl,
p-butoxyphenyl,
2-butoxy-3,5-diiodophenyl,
4-butoxy-3,5-diiodophenyl,
4-butoxy-3,5-dimethoxyphenyl,
4-butoxy-3-ethoxyphenyl,
4-butoxy-3-methoxyphenyl,
o-butylphenyl,
o-tert.butylphenyl,
p-butylphenyl,
p-sec.butylphenyl,
p-tert.butylphenyl,
3-butyl-5-sec.butyl-4-hydroxyphenyl,
3-tert.butyl-5-cyclohexyl-4-hydroxyphenyl,
4-sec.butyl-2,6-dimethylphenyl,
4-tert.butyl-2,6-dimethylphenyl,
3-tert.butyl-4-hydroxy-5-nitrophenyl,
3-sec.butyl-4-hydroxy-5-nonylphenyl,
3-tert.butyl-4-hydroxy-5-tert.pentylphenyl,
3-sec.butyl-4-hydroxy-5-propylphenyl,
p-(butylmethylamino)phenyl,
m-chlorophenyl,
o-chlorophenyl,
p-chlorophenyl,
2-chloro-4-(diethylamino)phenyl,
4-chloro-2,6-dimethylphenyl,
2-chloro-4-(dimethylamino)phenyl,
4-chloro-3-fluorophenyl,
2-chloro-4-hydroxyphenyl,
2-chloro-5-hydroxyphenyl,
3-chloro-4-hydroxyphenyl,
3-chloro-5-hydroxyphenyl,
4-chloro-3-hydroxyphenyl,
2-chloro-3-hydroxy-4-nitrophenyl,
2-chloro-6-mercaptophenyl,
3-chloro-4-(methylamino)phenyl,
2-chloro-3-nitrophenyl,
2-chloro-4-nitrophenyl,
2-chloro-5-nitrophenyl,
2-chloro-6-nitrophenyl,
4-chloro-2-nitrophenyl,
4-chloro-3-nitrophenyl,
5-chloro-2-nitrophenyl,
p-cyclohexylphenyl,
p-cyclopentadienylphenyl,
p-cyclopropylphenyl,
2,4-dibromophenyl,
2,6-dibromophenyl,
3,4-dibromophenyl,
3,5-dibromophenyl,
2,4-dibromo-5-hydroxyphenyl,
3,5-dibromo-4-hydroxyphenyl,
2,4-dibutoxyphenyl,
2,5-dibutoxyphenyl,
2,6-di-tert.-butylphenl,
3,5-di-tert.-butylphenyl,
3,5-di-tert.-butyl-4-hydroxyphenyl,
2,3-dichlorophenyl,
2,4-dichlorophenyl,
2,5-dichlorophenyl,
2,6-dichlorophenyl,
3,4-dichlorophenyl,
3,5-dichlorophenyl,
2,6-dichloro-4-(diethylamino)phenyl,
2,6-dichloro-3-hydroxyphenyl,
3,5-dichloro-4-hydroxyphenyl,
2,6-dichloro-3-nitrophenyl,
3,6-dichloro-2-nitrophenyl,
3,5-dicyclohexyl-4-hydroxyphenyl,
2,5-diethoxyphenyl,
3,4-diethoxyphenyl,
2,4-diethoxy-5-ethylphenyl,
2,4-diethoxy-5-hexylphenyl,
2,4-diethoxy-5-propylphenyl,
3,5-diethylphenyl, p-(diethylamino)phenyl,
3,5-diethyl-4-hydroxyphenyl,
2,4-dihydroxyphenyl,
2,5-dihydroxyphenyl,
2,6-dihydroxyphenyl,
3,4-dihydroxyphenyl,
3,4-dihydroxy-5-methoxyphenyl,
3,5-diiodo-2-(pentyloxy)phenyl,
3,5-diiodo-4-(pentyloxy)phenyl,
3,5-diiodo-2-propoxyphenyl,
3,5-diiodo-4-propoxyphenyl,
2,3-dimethoxyphenyl,
2,4-dimethoxyphenyl,
2,5-dimethoxyphenyl,
2,6-dimethoxyphenyl,
3,4-dimethoxyphenyl,
3,5-dimethoxyphenyl,
2,4-dimethoxy-3-nitrophenyl,
2,4-dimethoxy-5-nitrophenyl,
2,5-dimethoxy-4-nitrophenyl,
3,6-dimethoxy-2-nitrophenyl,
3,4-dimethoxy-5-phenoxyphenyl,
2,4-dimethoxy-5-propylphenyl,
2,4-dimethox-6-vinylphenyl,
2,4-dimethylphenyl,
2,5-dimethylphenyl,
2,6-dimethylphenyl,
3,4-dimethylphenyl,
3,5-dimethylphenyl,
m-(dimethylamino)phenyl,
p-(dimethylamino)phenyl,
4-(dimethylamino)-2,6-dimethylphenyl,
p-(3,3-dimethylcyclohexyl)phenyl,
3,5-dimethyl-4-nitrophenyl,
2,4-dinitrophenyl,
2,5-dipropoxyphenyl,
o-ethoxyphenyl,
p-ethoxyphenyl,
2-ethoxy-3,4-dimethylphenyl,
3-ethoxy-2,4-dimethylphenyl,
4-ethoxy-2,3-dimethylphenyl,
4-ethoxy-2,5-dimethylphenyl,
2-ethoxy-5-fluorophenyl,
4-ethoxy-3-fluorophenyl,
2-ethoxy-3-hydroxyphenyl,
3-ethoxy-4-hydroxyphenyl,
4-ethoxy-3-hydroxyphenyl,
3-ethoxy-4-isobutoxyphenyl,
3-ethoxy-4-(isopentyloxy)phenyl,
3-ethoxy-4-isopropoxyphenyl,
3-ethoxy-4-methoxyphenyl,
4-ethoxy-3-methoxyphenyl,
2-ethoxy-4-nitrophenyl,
4-ethoxy-2-nitrophenyl,
3-ethoxy-4-(pentyloxy)phenyl,
3-ethoxy-4-propoxyphenyl,
m-ethylphenyl,
o-ethylphenyl,
p-ethylphenyl,
3-(1-ethylheptyl)-4-hydroxy-5-propylphenyl,
3-ethyl-4-hydroxy-5-isopropylphenyl,
4-ethyl-3-nitrophenyl,
p-(ethylpropylamino)phenyl,
p-(ethylthio)phenyl,
2-ethyl-3,4,5-trimethoxyphenyl,
m-fluorophenyl,
o-fluorophenyl,
p-fluorophenyl,
2-fluoro-6-nitrophenyl,
4-fluoro-2-nitrophenyl,
5-fluoro-2-nitrophenyl,
p-(heptylthio)phenyl,
5-hexyl-2,4-dimethoxyphenyl,
o-(hexyloxy)phenyl,
p-(hexyloxy)phenyl,
2-(hexyloxy)-3,5-diiodophenyl,
4-(hexyloxy)-3,5-diiodophenyl,
m-hydroxyphenyl,
o-hydroxyphenyl,
p-hydroxyphenyl,
4-hydroxy-3,5-diiodophenyl,
4-hydroxy-3,5-diisopropylphenyl,
4-hydroxy-3,5-dimethoxyphenyl,
3-hydroxy-2,4-dimethylphenyl,
3-hydroxy-4,5-dimethylphenyl,
4-hydroxy-2,3-dimethylphenyl,
4-hydroxy-2,5-dimethylphenyl,
4-hydroxy-2,6-dimethylphenyl,
4-hydroxy-3,5-dimethylphenyl,
5-hydroxy-2,4-dimethylphenyl,
o-(2-hydroxy-1,1-dimethylethyl)phenyl,
4-hydroxy-3,5-dinitrophenyl,
4-hydroxy-3,5-di-tert.pentylphenyl,
4-hydroxy-2-iodophenyl,
4-hydroxy-3-iodo-5-nitrophenyl,
3-hydroxy-4-isopropylphenyl,
4-hydroxy-3-methoxyphenyl,
o-(1-hydroxy-1-methylethyl)phenyl,
4-hydroxy-3-(1-methylpentyl)-5-pentylphenyl,
4-(hydroxymethyl)-2,3,5,6-tetramethylphenyl,
3-hydroxy-4-nitrophenyl,
4-hydroxy-2-nitrophenyl,
4-hydroxy-3-nitrophenyl,
5-hydroxy-2-nitrophenyl,
o-(1-hydroxy-2-nitroethyl)phenyl,
3-hydroxy-1,4,5,6-tetramethylphenyl,
4-hydroxy-2,3,5,6-tetramethylphenyl,
3-hydroxy-2,4,5-trimethylphenyl,
4-hydroxy-2,3,5-trimethylphenyl,
4-hydroxy-2,3,6-trimethylphenyl,
m-iodophenyl,
o-iodophenyl,
p-iodophenyl,
4-iodo-2-nitrophenyl,
o-isobutoxyphenyl,
isobutylphenyl,
p-(isobutylmethylamino)phenyl,
p-(isobutylthio)phenyl,
isohexylphenyl,
isopentylphenyl,
5-isopentyl-2,4-dimethoxyphenyl,
o-(isopentyloxy)phenyl,
p-isopropenylphenyl,
o-isopropoxyphenyl,
p-isopropoxyphenyl,
4-isopropoxy-3,5-dimethoxyphenyl,
4-isopropoxy-3-methoxyphenyl,
4-isopropoxy-3-methoxy-2-nitrophenyl,
m-isopropylphenyl,
o-isopropylphenyl,
p-isopropylphenyl,
4-isopropyl-2,6-dimethylphenyl,
p-(isopropylmethylamino)phenyl,
p-(isopropylthio)phenyl,
o-mercaptophenyl,
3-methoxy-4-(2-methylbutoxy)phenyl,
2-methoxy-3,4-(methylenedioxy)phenyl,
2-methoxy-4,5-(methylenedioxy)phenyl,
3-methoxy-4,5-(methylenedioxy)phenyl,
4-methoxy-2,3-(methylenedioxy)phenyl,
3-methoxy-4-(octyloxy)phenyl,
3-methoxy-4-phenoxyphenyl,
4-methoxy-3-phenoxyphenyl,
4-methoxy-3-propoxyphenyl,
3-methoxy-4-(p-tolyloxy)phenyl,
4-methoxy-3-(p-tolyoxyl)phenyl,
p-(methylamino)phenyl,
2,3-(methylenedioxy)phenyl,
3,4-(methylenedioxy)phenyl,
p-(methylpropylamino)phenyl, o-(methylthio)phenyl,
p-(methylthio)phenyl,
m-nitrophenyl,
o-nitrophenyl,
p-nitrophenyl,
p-octylphenyl,
o-(octyloxy)phenyl,
p-(octyloxy)phenyl,
p-pentylphenyl,
o-(pentyloxy)phenyl,
p-(pentyloxy)phenyl,
p-phenethyl-,
p-phenoxyphenyl,
o-propoxyphenyl,
p-propoxyphenyl,
2,3,4,6-tetramethylphenyl,
2,4,6-tribromo-3-hydroxyphenyl,
2,3,6-trichlorophenyl,
2,4,6-trichlorophenyl,
3,4,5-trichlorophenyl,
2,3,4-trihydroxyphenyl,
2,4,5-trihydroxyphenyl,
2,4,6-trihydroxyphenyl,
2,4,6-triisopropylphenyl,
2,3,4-trimethoxyphenyl,
2,3,5-trimethoxyphenyl,
2,3,6-trimethoxyphenyl,
2,4,5-trimethoxyphenyl,
2,4,6-trimethoxyphenyl,
3,4,5-trimethoxyphenyl,
2,3,5-trimethylphenyl,
2,4,5-trimethylphenyl,
2,4,6-trimethylphenyl,
2,4,6-trinitrophenyl,
o-vinylphenyl,
p-vinylphenyl,
4-biphenyl-ylmethyl,
bis-(p-bromophenyl)methyl,
bis-(p-chlorophenyl)methyl,
bis-(p-fluorophenyl)methyl,
bis-(2-hydroxy-5-nitrophenyl)methyl,
bis-(2-methoxyphenyl)methyl,
bis-(4-methoxyphenyl)methyl,
4-chlorobenzyl,
4-isopropylbenzyl,
α-cyclohexylbenzyl,
2,5-dihydroxybenzyl,
3,4-dihydroxybenzyl,
3,4-dimethoxybenzyl,
3,5-dimethoxybenzyl,
p-dimethylaminobenzyl,
α-phenylbenzyl,
α-(3,4-dimethylphenyl)-3,4-dimethylbenzyl,
4-hydroxybenzyl,
α-hydroxy-2-methylbenzyl,
2-methoxybenzyl,
3-methoxybenzyl,
4-methoxybenzyl,
(p-methylbenzylamino)benzyl,
3,4-methylenedioxybenzyl,
2,3,4-trimethoxybenzyl,
3,4,5-trimethoxybenzyl,
3,4,5-trimethyl-2-nitrobenzyl,
1,2-diphenylethyl,
2,2-diphenylethyl,
2-isobutoxy-1,1-diphenylethyl,
1-methyl-2,2-diphenylethyl,
1-phenethyl,
2-phenethyl,
2-benzyl-3-phenylpropyl,
1,1-difluoro-4-phenylpropyl,
2,2-diphenylpropyl,
3,3-diphenylpropyl,
1-(p-fluorophenyl)propyl,
3-hydroxy-4-phenyl-2-butyl,
3-(o-hydroxyphenyl)propyl,
3-(p-hydroxyphenyl)propyl,
4-phenyl-2-butyl,
α-isopropylbenzyl,
3-phenylpropyl,
1-(4-biphenylyl)butyl,
3,5-diethoxy-5-phenyl-1-methylbutyl,
2,4-diethoxy-4-phenylbutyl,
3-dimethylamino-1,1-diphenylbutyl,
1,1-diphenylbutyl,
2-ethoxy-4-(ethylthio)-4-phenylbutyl,
4-phenylbutyl,
2,4-diethoxy-4-phenylpentyl,
4-methyl-4-phenylphentyl,
1-chloro-2,2-diphenylvinyl,
2-chloro-1,2-diphenylvinyl,
1,2-diphenylvinyl,
2,2-diphenylvinyl,
1,2-diphenylpropenyl,
1,3-phenylpropenyl,
2-hydroxy-1-methylpropenyl,
1-phenylpropenyl,
3,3-diphenylallyl,
3-phenylallyl,
1-hydroxy-1,3-diphenylpropargyl,
3-phenylpropargyl,
2,4-bis(p-methoxyphenyl)-1-buten-1-yl,
4-ethoxy-4-phenyl-1-buten-1-yl,
1-phenyl-1-buten-1-yl,
3-phenyl-1-buten-1-yl,
1,1-dimethyl-3-phenyl-2-buten-1-yl,
2-ethoxy-4-phenyl-3-buten-1-yl,
4-(p-dimethylaminophenyl)-1,3-butadien-1-yl,
4-(p-dimethylamino-4-phenyl)-1,3-butadien-1-yl,
4,4-diphenyl-1,3-butadien-1-yl,
6-phenyl,3,5-hexadien-3-yl,
4-(p-methoxyphenyl)-1,3-butadien-1-yl,
4-phenyl-1-methyl-1,3-butadien-1-yl,
3-methyl-4-phenyl-1,3-butadien-1-yl,
3-methyl-4-(p-nitrophenyl)-1,3-butadien-1-yl,
4-phenyl-1,3-butadien-1-yl,
4-ethoxy-4-phenyl1-penten-1-yl,
2-ethoxy-4-phenyl-3-penten-1-yl,
2-(2-furyl)ethyl-,
2-[5-(2-benzoylethyl)-2-furyl]ethyl,
2-[5-(2-cyclopropyl-cyclopropyl)-2-furyl]ethyl,
2-[5-(2-cyclopropylcyclopropyl)-2-furyl]-2-methylethyl,
5-[2-(dimethoxymethyl)butyl]-,
5-(3,3-dimethoxy-2-methylpropyl)-,
5-(3,3-dimethoxypropyl)-,
1-methyl-2-(5-methyl-2-furyl)ethyl,
2-methyl-2-(5-methyl-2-furyl)ethyl,
2-ethoxy-2-(2-furyl)ethyl,
1-ethyl-2-(2-furyl)ethyl,
2-[5-(3-hydroxybutyl)-2-furyl]ethyl,
2-[5-(3-hydroxybutyl)-2-furyl]-2-methylethyl,
2-[5-(hydroxymethyl)-2-furyl]ethyl,
2-[5-(2-hydroxymethylbutyl)-2-furyl]-2-methylethyl,
2-[5-(2-hydroxy-2-methylpropyl)-2-furyl]propyl,
2-[5-(3-hydroxypropyl)-2-furyl]ethyl,
2-[5-(3-hydroxypropyl)-2-furyl-2-methylethyl,
3-(2-furyl)-1-methylethyl,
2-(5-methyl-2-furyl)ethyl,
2-[5-(2-methylcyclopropyl)-2-furyl]ethyl,
2-methyl-2-[5-(2-methylcyclopropyl)furyl]ethyl,
2-(5-bromo-2-furyl)ethyl,
2-furylhydroxymethyl,
5-nitro-2-furylhydroxymethyl,
2-furylvinyl,
1-bromo-2-(5-bromo-5-nitro-2-furyl)vinyl,
2-(5-bromo-2-furyl)vinyl,
1-ethoxymethyl-2-(2-furyl)vinyl,
1-ethoxymethyl-2-(5-nitro-2-furyl)vinyl,
1-ethyl-2-(5-nitro-2-furyl)vinyl,
2-[5-(2,4-hexadiynyl)-2-furyl]vinyl, 2-(5-iodo-2-furyl)vinyl,
1-isopropyl-2-(2-furyl)vinyl,
1-isopropyl-2-(5-nitro-2-furyl)vinyl,
1-(methoxymethyl)-2-(2-furyl)vinyl,
1-(methoxymethyl)-2-(5-nitrofuryl)vinyl,
2-(5-methyl-2-furyl)vinyl,
1-methyl-2-(5-nitro-2-furyl)vinyl,
2-methyl-2-(5-nitro-2-furyl)vinyl,
2-[5-(5-methylthio-4-penten-2-ynyl)]vinyl,
2-(5-nitro-2-furyl)vinyl,
2-(2-furyl)-1-pentylvinyl,
2-(3-furyl)vinyl,
2-(furfuryl)vinyl,
1-(5-nitro-2-furyl)vinyl,
1-(2,2-dimethyl-5-phenyl-3(2H)-furylidene)methyl,
2-furyl,
5-amino-2-furyl,
5-benzyl-2-furyl,
5-(benzylthio)-2-furyl,
5-[(benzylthio)methyl]-2-furyl,
5-bromo-2-furyl,
4-bromo-5-(butylthio)-2-furyl,
4-bromo-5-(ethylthio)-2-furyl,
4-bromo-5-(methylthio)-2-furyl,
4-bromo-5-nitro-2-furyl,
5-(butoxymethyl)-2-furyl,
5-[(butylthio)methyl]-2-furyl,
5-[(tert.butylthio)methyl]-2-furyl,
5-chloro-2-furyl,
5-(chloromethyl)-2-furyl,
4,5-dibromo-2-furyl,
3,4-dichloro-2-furyl,
3,4-dichloro-5-nitro-2-furyl,
4,5-dimethyl-2-furyl,
5-(dimethylamino)-2-furyl,
5-[2,4-dinitrophenyl)thio]-2-furyl,
4,5-diphenyl-2-furyl,
5-(ethoxymethyl)-2-furyl,
5-ethyl-2-furyl,
5-ethyl-3-(ethylthio)-2-furyl,
5-[(ethylthio)methyl]-2-furyl,
5-(2,4-hexadiynyl)-2-furyl,
5-hexyl-2-furyl,
5-(3-hexynyl)-2-furyl,
5-(hydroxymethyl)-2-furyl,
5-iodo-2-furyl,
5-[(isopentyloxy)methyl]-2-furyl,
5-[(isopropylthio)methyl]-2-furyl,
5-mercapto-2-furyl,
5-(p-methoxybenzyl)-2-furyl,
5-[(2-methoxyethoxy)methyl]-2-furyl,
5-(methoxymethyl)-2-furyl,
4-methoxy-5-nitro-2-furyl,
5-(p-methoxyphenyl)-2-furyl,
5-methyl-2-furyl,
5-(p-methylbenzyl)-2-furyl,
3-methyl-4-phenyl-2-furyl,
5-(methylthio)-2-furyl,
5-nitro-2-furyl,
5-[(octyloxy)methyl]-2-furyl,
5-(phenylthio)-2-furyl,
5-[(phenylthio)methyl]-2-furyl,
5-(propoxymethyl)-2-furyl,
5-(2-propynyl)-2-furyl,
5-styryl-2-furyl,
2-(butylthio)-5-methyl-2-furyl,
5-ethyl-2-furyl,
2-(ethylthio)-5-propyl-2-furyl,
4-iodo-2-furyl,
2-methyl-2-furyl,
3-furyl,
2-(butylthio)-5-methyl-3-furyl,
2-methyl-3-furyl,
2-thenyl,
5-chloro-2-thenyl,
2-(2-thienyl)vinyl,
1-bromo-2-(5-nitro-2-thienyl)vinyl,
2-bromo-2-(5-nitro-2-thienyl)vinyl,
1-chloro-2-(2-thienyl)vinyl,
2-(5-chloro-2-thienyl)vinyl,
2-(2,5-dihydroxy-2-thienyl)vinyl,
2-(3-methyl-2-thienyl)vinyl,
2-(5-nitro-2-thienyl)vinyl,
α-pentyl-1-pentyl-2-(2thienyl)vinyl,
2-thienyl,
5-benzyl-2-thienyl,
5-bromo-2-thienyl,
5-butyl-2-thienyl,
4-tert.butyl-2-thienyl,
5-tert.butyl-2-thienyl,
5-p-tert.butylbenzyl-2-thienyl,
5-chloro-2-thienyl,
5-(m-chlorophenyl)-2-thienyl,
5-(2-chlorophenyl-1-phenylvinyl)-2-thienyl,
5-(4-cyclohexylhexyl)-2-thienyl,
5-(cyclohexylmethyl)-2-thienyl,
5-(3-cyclohexylpropyl)-2-thienyl,
5-decyl-2-thienyl,
3,4-dimethyl 2-thienyl,
3,5-dimethyl-2-thienyl,
4,5-dimethyl-2-thienyl,
3,5-dinitro-2-thienyl,
3,5-diphenyl-2-thienyl,
5-(1,2-diphenylvinyl)-2-thienyl,
3,5-di-p-tolyl-2-thienyl,
5-dodecyl-2-thienyl,
5-ethyl-2-thienyl,
5-heptyl-2-thienyl,
5-hexyl-2-thienyl,
5-isobutyl-2-thienyl,
5-isopentyl-2-thienyl,
5-isopropyl-2-thienyl,
5-methoxy-2-thienyl,
3-methyl-2-thienyl,
4-methyl-2-thienyl,
5-methyl-2-thienyl,
5-(methylthio)-2-thienyl,
4-nitro-2-thienyl,
5-nitro-2-thienyl,
5-octyl-2-thienyl,
5-pentyl-2-thienyl,
5-phenethyl-2-thienyl,
5-phenyl-2-thienyl,
5-propyl-2-thienyl,
5-(1-propynyl)-2-thienyl,
5-styryl-2-thienyl,
5-m-tolyl-2-thienyl,
trimethyl-2-thienyl,
5-undecyl-2-thienyl,
3-thienyl,
2-bromo-3-thienyl,
2-chloro-3-thienyl,
2,5-di-tert.butyl-3-thienyl,
2,5-di-tert.butyl-4-methyl-3-thienyl,
2,5-dichloro-3-thienyl,
2,5-diethyl-3-thienyl,
2,5-dimethyl-3-thienyl,
2-methyl-5-propyl-3-thienyl,
5-methyl-2-propyl-3-thienyl,
trimethyl-3-thienyl,
α-carboxy-2-thenyl (from 2-thiophenemalonaldehydric acid),
3-indolylmethyl,
5-hydroxy-3-indolylmethyl,
4-indolylmethyl,
2-(3-indolyl)vinyl,
1-(1-methyl-2-phenyl-3-indolyl)-2-phenylvinyl,
3-indolyl,
5-(benzyloxy)-3-indolyl,
5-(benzyloxy)-1-methyl-3-indolyl, 5-bromo-3-indolyl,
5-chloro-3-indolyl,
1,2-dimethyl-3-indolyl,
1-(2-dimethylaminoethyl)-3-indolyl,
1-(dimethylaminomethyl)-3-indolyl,
2-methoxy-3-indolyl,
5-methoxy-3-indolyl,
2-methoxy-1-methyl-3-indolyl,
1-methyl-3-indolyl,
2-methyl-3-indolyl,
5-methyl-3-indolyl,
1-methyl-2-phenyl-3-indolyl,
2,3-dimethyl-5-indolyl,
2,3-dimethyl-6-indolyl,
2,3-dimethyl-7-indolyl,
3-indolyl-hydroxymethyl,
2-(3-indolyl)ethyl,
1-amino-2-(3-indolyl)methyl,
2-pyridylmethyl,
3-pyridylmethyl,
2-pyridylmethylvinyl,
3-pyridylmethylvinyl,
3-(2-pyridyl)propyl,
3-hydroxy-3-(2-pyridyl)propyl,
3-hydroxy-3-methyl-3-(2-pyridyl)propyl,
3-hydroxy-3-phenyl-3-(2-pyridyl)propyl,
2-pyridyl,
3-pyridyl,
4-pyridyl,
3-amino-2-pyridyl,
3-butyl-2-pyridyl,
4-chloro-2-pyridyl,
4-chloro-5-ethyl-2-pyridyl,
4-chloro-6-methyl-2-pyridyl,
4-ethoxy-5-ethyl-2-pyridyl,
3-ethyl-2-pyridyl,
5-ethyl-4-methoxy-2-pyridyl,
5-ethyl-4-methyl-2-pyridyl,
3-hydroxy-2-pyridyl,
6-(hydroxymethyl)-2-pyridyl,
3-methoxy-2-pyridyl,
4-methoxy-2-pyridyl,
4-methoxy-6-methyl-2-pyridyl,
3-methyl-2-pyridyl,
4-methyl-2-pyridyl,
5-methyl-2-pyridyl,
6-methyl-2-pyridyl,
6-methyl-4-nitro-2-pyridyl,
5-nitro-2-pyridyl,
3-pentyl-2-pyridyl,
3-propyl-2-pyridyl,
2-amino-3-pyridyl,
6-dimethylamino-3-pyridyl,
5-hydroxy-4-(hydroxymethyl)-6-methyl-3-pyridyl,
4-methyl-3-pyridyl,
5-methyl-3-pyridyl,
2-(2-pyridyl)ethyl,
2-(p-chlorophenyl)-2-(2-pyridyl)ethyl,
2-phenyl-2-(2-pyridyl)ethyl,
2-(3-pyridyl)ethyl, and
2-(p-chlorophenyl)-2-(3-pyridyl)ethyl.

The reaction between the starting compound for Formula II and the aldehyde, R₂CHO, proceeds readily at room temperature or with mild heating, say up to the boiling point of the reaction mixture. The proportions are not critical through ordinarily a large excess of the aldehyde is desirable for good yields. If the aldehyde is water soluble it may be used as an aqueous solution. The excess aldehyde may also function as a solvent or vehicle for the reaction except where solid aldehydes are employed. Another solvent is then used, for example, tetrahydrofuran, lower alcohols and ethers, dioxane, chlorinated hydrocarbon solvents, dimethylsulfoxide, acetonitrile, and benzene. Even so a large excess of the aldehyde is desirable. Ordinarily it will be sufficient to use between a 2 and a 20 fold excess.

The reaction is effected under non-acidic conditions. Here, too, the conditions are not critical as long as the reaction is definitely not acidic. If the starting compound is in the form of the hydrochloride salt, or other acid addition salt, sufficient base must be used to neutralize the acid. If not it is sufficient simply to mix the free base starting compound with the aldehyde and a neutral solvent such as excess aldehyde, water, tetrahydrofuran, or the like. Additional base can be used if desired and sometimes better yields are obtained if the reaction is effected in the presence of added base, i.e., base other than the free base starting compound. Aromatic amines can be used with advantage for this purpose. Ordinarily when an aqueous menstruum is used it will be sufficient to adjust the pH of the reaction mixture to between about pH 8 and about pH 10 or 11. Where an anhydrous or a substantially anhydrous menstruum is used, as for example when tetrahydrofuran is used as the solvent or an excess of anhydrous aldehyde, a water adsorbing polymer, such as a molecular sieve, can be added to take up the water of formation.

The compounds of the invention (Formula I) can exist in either the free base form or in the form of an acid addition salt. Unless otherwise specified or otherwise dictated by the context both the acid addition form and the free base form is intended. These acid addition salts can be made by neutralizing the free base with the appropriate acid. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, dimethyldithiocarbamic, hexadecylsulfamic, octadecylsulfamic, sorbic, monochloroacetic, undecylenic, 4'-hydroxyazobenzene-4-sulfonic, octadecylsulfuric, picric, benzoic, cinnamic, and like acids.

The acid-addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate and the aqueous solution of the salt extracted with various water-immiscible solvents before regenerating the free base form by treatment of the thus-extracted acid solution or converted to another salt by metathesis.

The free bases can be used as buffers or as antacids. They react with isocyanates to form urethanes and can be used to modify polyurethane resins. The thiocyanic acid addition salt when condensed with formaledhyde forms resinous materials useful as pickling inhibitors according to U.S. Pats. 2,425,320 and 2,606,155. The free bases also make good vehicles for toxic acids. For example, the fluosilicic acid addition salts are useful as mothproofing agents according to U.S. Pats. 1,915,334 and 2,075,359 and the hexafluoroarsenic acid and hexafluorophosphoric acid addition salts are useful as parasiticides according to U.S. Pats. 3,122,536 and 3,122,552.

The invention may now be more fully understood by referring to the following examples in which solvent ratios are by volume, the parts otherwise by weight, and the c.g.s. system is used.

EXAMPLE 1

Methyl 7-chloro - 6,7,8 - trideoxy-6-(5,6,7,7aα-tetrahydro-1-oxo - 6α - propyl-1H-pyrrolo[1,2-c]imidazol-2-(3H)-yl)-1-thio-L-threo-α-D-galacto-octopyranoside

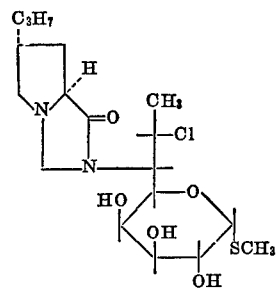

1' - demethylclindamycin hydrochloride, 7(S)-chloro-7-deoxy-1'-demethyllincomycin hydrochloride (2.0 g.) was dissolved in 200 ml. of water. The solution was mixed with 20 ml. of 1 N sodium hydroxide and 20 ml. of formaldehyde solution (37% w./v.). The mixture was allowed to stand at ambient temperature for 1.5 hrs. The solution was free-dried and then triturated with 50 ml. of water. The crystalline material formed, was isolated by filtration and dried. Yield 1.5 g. methyl 7-chloro-6,7,8-trideoxy - 6 - (5,6,7,7aα-tetrahydro-1-oxo-6α-propyl-1H-pyrrolo[1,2-c]imidazol - 2(3H) - yl)-1-thio-L-threo-α- D-galacto-octopyranoside having the following characteristics: $[\alpha]_D^{25}+188°$ (c., 1.04, water).

*Analysis.*—Calcd. for $C_{18}H_{31}ClN_2O_5S$ (percent): C, 51.23; H, 7.40; Cl, 8.40; N, 6.64; S, 7.60. Found (percent): C, 50.62; H, 7.26; Cl, 8.14; N, 6.38; S, 7.54.

By substituting 1'-dimethylclindamycin hydrochloride by its 4'-epimer, 7(S) - chloro-7-deoxy-1'-demethyl-4'-epilincomycin hydrochloride of the formula

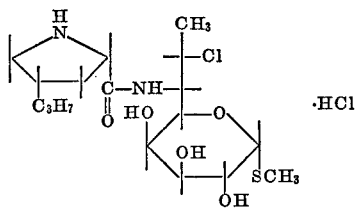

the corresponding epimer, methyl 7-chloro-6,7,8-trideoxy-6-(5,6,7,7aα - tetrahydro - 1 oxo-6β-propyl-1H-pyrrolo[1,2-c]-imidazol - 2(3H) - yl)-1-thio-L-threo-α-D-galacto-octopyranoside is obtained.

By substituting the 1'-demethylclindamycin hydrochloride and its 4'-epimer by their 7-epimers, 7(R)-chloro-7-deoxy-1'-demethyllincomycin hydrochloride of the formula

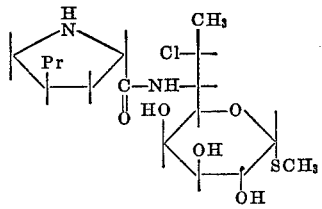

and (S) - chloro - 7 - deoxy-1'-demethyl-4'-epilincomycin hydrochloride of the formula

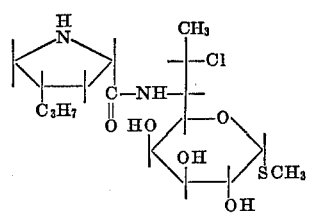

the corresponding epimers, methyl 7-chloro-6,7,8-trideoxy-6-(5,6,7,7aα-tetrahydro -1 - oxo - 6α- and β-propyl-1H-pyrrolo - [1,2-c]imidazol - 2(3H)-yl)-1-thio-D-erythro-α-D-galactooctopyranosides are obtained.

By making like substitutions in the following examples the corresponding epimers are obtained.

EXAMPLE 2

Methyl 7-chloro - 6,7,8 - trideoxy - 6-(5,6,7,7aα-tetrahydro - 1 - oxo - 6α-pentyl-1H-pyrrolo[1,2-c]imidazol-2-(3H) - yl) - 1 - thio-L-threo-α-D-galacto-octopyranoside

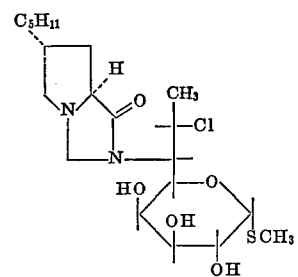

Two g. of 1'-demethyl - 4' - depropyl-4'-n-pentylclindamycin hydrochloride was dissolved in 400 ml. of water. The clear solution was mixed with 50 ml. of aqueous formaldehyde solution (37%) and 50 ml. of 1 N aqueous sodium hydroxide solution. The solution turned cloudy, therefore 150 ml. of dioxane was added. The reaction mixture was allowed to stand at room temperature for 1.5 hrs. The solution was freeze-dried and then triturated with 50 ml. of water. Insoluble material was isolated by filtration and dried, yielding methyl 7-chloro-6,7,8-trideoxy-6-(5,6,7,7,7aα-tetrahydro - 1 - oxo-6α-pentyl-1H-pyrrolo[1,2-c]imidazol - 2(3H)-yl) - 1 - thio-L-threo-α-D-galacto-octopyranoside having the following characteristics: $[\alpha]_D^{25}+191°$ (c., 1, 95 percent ethanol).

*Analysis.*—Calcd. for $C_{20}H_{35}ClN_2SO_5 \cdot H_2O$ (percent): C, 51.50; H, 7.51; Cl, 7.60; N, 6.00; S, 6.86. Found (percent): C, 51.16; H, 7.28; Cl, 6,43; N, 6.07; S, 6.66.

EXAMPLE 3

Methyl 7-bromo - 6,7,8 - trideoxy - 6-(5,6,7,7aα-tetrahydro - 1 - oxo-6α - propyl-1H-pyrrolo[1,2-c]imidazol-2(3H)-yl)-1-thio-α-D-galacto-octopyranoside

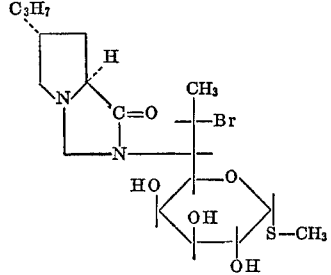

To a solution composed of 8.0 g. of 1'-demethyl-7(S)-bromo-7-deoxylincomycin·HCl, 100 ml. 37% formaldehyde solution and 400 ml. of water was added 20 ml. of 1 N sodium hydroxide. After stirring at 25° for 2 hrs. the reaction was freeze-dried. The solid residue was dissolved in 75 ml. of water, adjusted to pH 7.5 with 4 N hydrochloric acid and stirred for 1 hour. The solid precipitate was collected and dried to yield 5.7 g. of methyl 7-bromo-6,7,8 - trideoxy-6-(5,6,7,7aα-tetrahydro-1-oxo-6α-propyl-1H-pyrrolo[1,2-c]-imidazol-2(3H)-yl - 1 - thio-L-threo-α-D-galacto-octopyranoside having the following characteristics: $[\alpha]_D^{25}+229°$ (c., 0.98, $CHCl_3$).

*Analysis.*—Calcd. for $C_{18}H_{31}BrN_2O_5S$ (percent): C, 46.25; H, 6.69; Br, 17.10; N, 5.99; S, 6.86. Found (percent): C, 45.94; H, 7.41; Br, 16.71 N, 5.93; S, 6.49.

A portion of this material was dissolved in acetone and ethanolic·HCl added to pH 1. The hydrochloride salt which precipitated was collected and dried.

EXAMPLE 4

Methyl 7-bromo - 6,7,8 - trideoxy-6-(5,6,7,7aα-tetrahydro - 1 - oxo-6α-propyl - 1H - pyrrolo[1,2-c]imidazol-2(3H)-yl)-1-thio-L-threo-α-D-galacto-octopyranoside

Part A–4

Methyl 6,8-dideoxy-6-(5,6,7-7aα-tetrahydro - 1 - oxo-6α-propyl-1H - pyrrolo[1,2-c]imidazol - 2(3H)-yl)-1-thio-D-erythro-α-D-galacto-octopyranoside

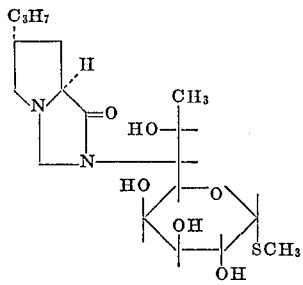

To a solution composed of 50 g. of 1'-demethyllincomycin·HCl, 20 ml. of 37% formaldehyde solution and 350 ml. of water was added 130 ml. of 1 N sodium hydroxide. After stirring at 25° for 1 hour the reaction was adjusted to pH 7.5 with 4 N HCl and freeze-dried to give 50 g. of methyl 6,8-dideoxy-6-(5,6,7,7aα-tetrahydro-1-oxo-6α-propyl - 1H-pyrrolo[1,2-c]imidazol-2(3H)-yl)-1-thio-D-erythro-α-D-galacto-octopyranoside.

Part B–4

Methyl 7 - bromo - 6,7,8 - trideoxy - 6 - (5,6,7aα-tetrahydro-1-oxo - 6α - propyl - 1H - pyrrolo[1,2-c]imidazol-2(3H)-yl)-1-thio-L-threo-α-D-galacto-octopyranoside A solution composed of 40 g. of the product of part A-4, 157 g. of triphenylphosphine and 2 l. of acetonitrile was cooled at 10° and a solution of 200 g. of carbon tetrabromide dissolved in 1000 ml. acetonitrile was added dropwise over a 30 min. period. After standing at 25° for 18 hrs. the reaction was evaporated to dryness under vacuum. The residue was dissolved in 2 l. methanol and the pH adjusted to 11 by the addition of 4 N KOH. After standing for 30 min. the pH was adjusted to 1 by the addition of 4 N HCl. Water, 1 l., was added and the methanol distilled under vacuum. The residue was filtered and the solid discarded. The filtrate was extracted well with CHCl$_3$ and the extracts discarded. The aqueous phase was made basic with 4 N KOH and extracted with CHCl$_3$. The CHCl$_3$ extracts were combined and evaporated under vacuum to give 38 g. of crude product. This material was purified via chromatography over silica gel using a EtOAc:acetone:H$_2$O (8:5:1) solvent system for elution. The product fractions were combined, evaporated and the residue recrystallized from EtOAc to give 15 g. of methyl 7-bromo-6,7,8-trideoxy-6-(5,6,7,7aα - tetrahydro-1-oxo-6α-propyl - 1H-pyrrolo[1,2-c]imidazol-2(3H)-yl)-1-thio-L-threo-α-D-galacto-octopyranoside having the following characteristics: M.P. 147–148°. $[\alpha]_D^{25}$ +236° (c., 0.93, CHCl$_3$).

Analysis.—Calcd. for $C_{18}H_{31}BrN_2O_5S$ (percent): C, 46.25; H, 6.69; Br, 17.10; N, 5.99; S, 6.86. Found (percent): C, 46.15; H, 6.62; Br, 17.34; N, 6.91; S, 6.69.

EXAMPLE 5

Methyl 6,8-dideoxy - 6 - (5,6,7,7aα-tetrahydro-1-oxo-6α-propyl - 1H - pyrrolo[1,2-c]imidazol - 2-(3H)-yl)-1-thio-D-erythro-α-D-galacto-octopyranoside 1'-demethyllincomycin hydrochloride (2.0 g.) was dissolved in 200 ml. of water. The solution was then mixed with 20 ml. of an aqueous solution of formaldehyde (30% w./v.) and 20 ml. of 1 N aqueous sodium hydroxide. The mixture was allowed to stand at room temperature for 3.5 hrs. Thin layer chromatography [silica gel G, methyl ethyl ketone, acetone, water (186:52:20 v./v.)] showed complete conversion of 1'-demethyllincomycin to a new bioactive (S. lutea) compound. The mixture was then freeze-dried. The freeze-dried material was dissolved in 200 ml. of water and passed through a column containing 100 ml. of Amberlite XAD–2 resin (a non-ionic, macro-porous copolymer of styrene crosslinked with divinyl benzene). The bioactive component was adsorbed on the resin and then it was eluted with absolute methanol. The methanolic eluate was concentrated to dryness. The residue was dissolved in minimum amount of methanol and this solution was mixed with ether. The precipitated material was isolated by filtration and dried yielding 1.35 g. of methyl 6,8-dideoxy-6-(5,6,7,7a-tetrahydro-1-oxo-6-propyl - 1H - pyrrolo[1,2-c]imidazol-2(3H)-yl) - 1 - thio-D-erythro-α-D-galacto-octopyranoside having the following properties: $[\alpha]_D^{25}$ +169.9° (c., 1.0, water).

Analysis.—Calcd. for $C_{18}H_{32}N_2O_6S$ (percent): C, 53.46; H, 7.92; N, 6.93; S, 7.92; O, 23.76. Found (percent): C, 53.91; H, 8.37; N, 8.03; S, 7.48 O, 23.79.

EXAMPLE 6

Methyl 6,8-dideoxy-6-(5,6,7,7aα-tetrahydro - 1 - oxo-3-methyl - 6α - propyl-1H-pyrrolo[1,2-c]imidazol-2(3H)-yl)-1-thio-D-erythro-α-D-galacto-octopyranoside

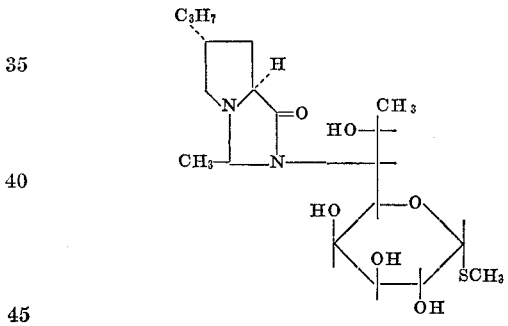

1'-demethyllincomycin hydrochloride (2.0 g.) was dissolved in 200 ml. of water. The solution was mixed with 20 ml. of 1 N aqueous sodium hydroxide and 20 ml. of acetaldehyde. The mixture was allowed to stand at room temperature for 3.5 hrs. and then freeze-dried to give crude methyl 6,8-dideoxy-6-(5,6,7-7aα-tetrahydro-1-oxo-3 - methyl - 6α-propyl-1H-pyrrolo[1,2-c]imidazol-2(3H)-yl)-1-thio-D-erythro-α-D-galacto - octopyranoside which can be further purified by the procedure of Example 5.

Following the procedures outlined in Examples 1 to 6, substituting the formaldehyde and acetaldehyde by propionaldehyde, butyraldehyde, pentanal, hexanal, heptanal, 2-hydroxyheptanal, octanal, nonanal, decanal, dodecanal, tetradecanal, hexadecanal, octadecanal, and isomeric thereof; halogenated aldehydes such as chloroacetaldehyde and 3-bromohexanal; alkoxy-substituted aldehydes such as 2-methoxybutyraldehyde; nitro-substituted aldehydes such as 5-nitropentanal; dialkylamino-substituted aldehydes such as 3-dimethylaminoheptanal; and hydroxy-substituted aldehydes such as glyceraldehyde and glyoxal there are obtained the corresponding compounds of Formula I wherein R is methyl, R$_1$ is propyl, X is halogen or hydroxy as the case may be, and R$_2$ is ethyl, propyl, butyl, pentyl, hexyl, 1-hydroxyhexyl, heptyl, octayl, nonyl, undecyl, tridecyl, pentadecyl, nonadecyl, and the isomeric forms thereof; chloromethyl, 2-bromopentyl, 1-methoxypropyl, 4-nitrobutyl, 2 - dimethylaminohexyl, 1,2-dihydroxyethyl, and hydroxymethyl.

EXAMPLE 7

Methyl 6,8-dideoxy-6-(5,6,7,7aα-tetrahydro-1-oxo-6α-propyl - 3 - (2-furyl) - 1H-pyrrolo[1,2-c]imidazol-2(3H)-yl)-1-thio-D-erythro-α-D-galacto-octopyranoside

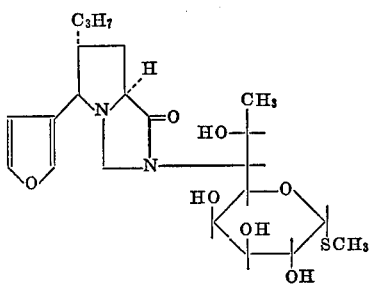

1'-demethyllincomycin hydrochloride (2.0 g.) was dissolved in 200 ml. of water and 100 ml. of absolute methanol. The solution was then mixed with 20 ml. of 1 N aqueous sodium hydroxide and 20 ml. of furfuraldehyde. The mixture was allowed to stand at room temperature for 3.5 hrs. The mixture was then freeze-dried.

The freeze-dried material was dissolved in 200 ml. of water and the solution was passed over 100 ml. of Amberlite XAD–2. The bioactive components were adsorbed on the resin and were eluted by absolute methanol. Fractions containing the new bioactive component were combined and the solution was concentrated to dryness. The residue (1.7 g.) was further purified by chromatography over silica gel as described below.

The column was prepared from 300 g. of silica gel slurried in the solvent consisting of chloroform-methanol (6:1 v./v.). The slurry was added in a glass column and allowed to settle under atmospheric pressure. The residue (1.7 g.) obtained as described above was dissolved in 20 ml. of chloroform-methanol (6:1 v./v.) and the solution was mixed with 20 g. of silica gel. The mixture was concentrated to dryness. The obtained powder was added on the top of the column and the column was then eluted with the above solvent system. Fractions containing the new bioactive compound were concentrated to dryness. The residue was dissolved in 10 ml. of chloroform and the solution was mixed with 70 ml. of ether. The precipitated material was separated by filtration (70 mg.). The filtrate was mixed with 500 ml. of Skellysolve B. The new precipitate formed was isolated by filtration yielding 400 mg. of methyl 6,8-dideoxy-6-(5,6,7,7aα-tetrahydro-1-oxo-6α - propyl - 3 - (2-furyl)-1H-pyrrolo[1,2-c]imidazol-2 (3H) - yl) - 1-thio-D-erythro-α-D-galacto-octopyranoside having the following characteristics: $[\alpha]_D^{25}$ +173° (c., 1.0, water).

*Analysis.*—Calcd. for $C_{22}H_{34}N_2O_7S$ (percent): C, 56.22; H, 7.29; N, 5.96; O, 23.83; S, 6.82. Found (percent): C, 52.79; H, 7.49; N, 5.68; S, 6.76.

Following the procedure of Example 7, substituting the furfuraldehyde, by 5 - nitrofurfuraldehyde, 5 - hydroxyfurfuraldehyde, 4 - methoxyfurfuraldehyde, 3 - mercaptofurfuraldehyde, 5 - acetoxyfurfuraldehyde, 3 - (methylthio) - furfuraldehyde, 3,5 - dichlorofurfuraldehyde, or 5 - dimethylaminofurfuraldehyde, there are obtained the compounds of Example 7 in which the furyl group is substituted by 5-nitro, 5-hydroxy, 4-methoxy - 3 - mercapto, 5-acetoxy, 3 - (methylthio), 3,5 - dichloro, or 5-dimethylamino groups.

Also in place of furfuraldehyde there can be substituted any of the aldehydes where $R_2$ contains or is a heterocyclic radical, furyl, thienyl, pyridyl, or indolyl.

EXAMPLE 8

Methyl 6,8 - dideoxy - 6 - (5,6,7,7aα - tetrahydro - 1-oxo - 3 - phenyl - 6α - propyl - 1H - pyrrolo[1,2-c] imidazol (2(3H) - yl) - 1 - thio - D - erythro - α - D-galacto-octopyranoside

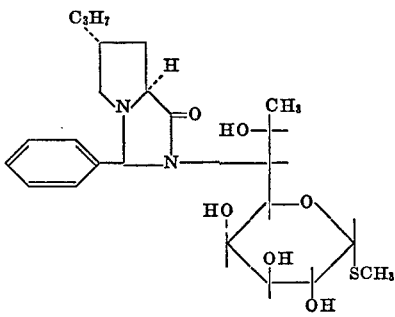

1'-dimethyllincomycin hydrochloride (2.0 g.) was dissolved in 200 ml. of water and 200 ml. of absolute methanol. The solution was then mixed with 20 ml. of 1 N aqueous sodium hydroxide and 20 ml. of benzaldehyde. The mixture was kept at room temperature for 3.5 hrs. and then freeze-dried to give a crude methyl 6,8-dideoxy-6-(5,6,7,7aα - tetrahydro - 1 - oxo - 3 - phenyl - 6α-propyl - 1H - pyrrolo[1,2-c]imidazol - 2(3H)-yl)-1-thio-D-erythro - α - D - galacto - octopyranoside which can be further purified by the procedure of Example 5.

EXAMPLE 9

Methyl 7-bromo - 6,7,8 - trideoxy - 6 - (5,6,7,7aα-tetrahydro - 1 - oxo - 6α - propyl-3-p-bromophenyl - 1H-pyrrolo[1,2-c]imidazol - 2(3H) - yl) - 1 - thio-L-threo-α-D-galacto-octopyranoside

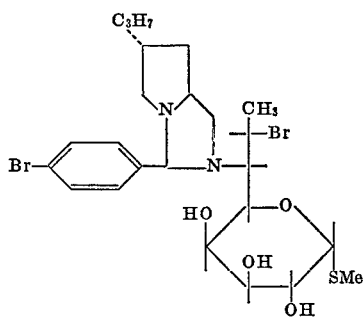

1'-demethyl - 7 - deoxy - 7(S) - bromolincomycin (5 g.) was refluxed with 10 g. of p-bromobenzaldehyde in 200 ml. of tetrahydrofuran containing 5 g. of water-adsorbent polymer commonly known as a molecular sieve (Linde molecular sieve, 4A, Linde Company) for 12 hrs. The molecular sieve was removed and the solution concentrated. The residue was chromatographed over 1.2 kg. of silica gel using acetone for elution. Fractions of 20 ml. each were collected. Fractions 172–235 were pooled and evaporated. The residue was dissolved in 20 ml. of ether and precipitated by addition of 300 ml. of Skellysolve B (technical hexane). The precipitate was collected and dried giving 700 mg. of methyl 7-bromo-6,7,8 - trideoxy - 6 - (5,6,7,7aα - tetrahydro - 1 - oxo-6α-propyl - 3 - p - bromophenyl - 1H - pyrrolo[1,2-c] imidazol - 2(3H) - yl) - 1 - thio-L-threo-α-D-galacto-octopyranoside having the following characteristics: $[\alpha]_D$ 197° (c., 1.0, EtOH).

*Analysis.*—Calcd. for $C_{24}H_{34}Br_2N_2O_5S$ (percent): C, 46.30; H, 5.47; Br, 25.72; N, 4.50; S, 5.14. Found (percent): C, 47.74; H, 5.62; Br, 25.45 N, 4.05; S, 4.96.

EXAMPLE 10

Methyl 7-chloro - 6,7,8 - trideoxy - 6 - (5,6,7,7aα-tetrahydro - 1 - oxo - 6α - propyl - 3 - p - chlorophenol-1H-pyrrolo[1,2-c]imidazol - 2(3H) - yl) - 1 - thio-L-threo-α-D-galacto-octopyranoside

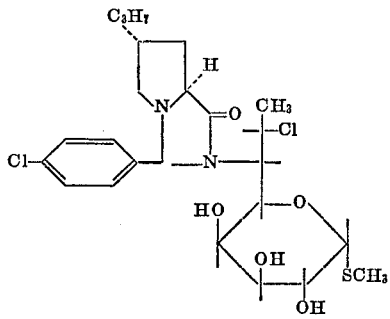

Following the procedure of Example 9, 3 g. of 1'-demethylclindamycin was treated with 4.2 g. of p-chlorobenzaldehyde in 150 ml. of tetrahydrofuran containing 3 g. of molecular sieve. Chromatography of the crude product over 1 kg. of silica gel using acetone-Skellysolve B (1:1) for elution. Twenty ml. fractions were collected. Fractions 120–160 ml. were pooled and evaporated to yield 350 mg. of methyl 7-chloro - 6,7,8 - trideoxy-6-(5,6,7,7aα-tetrahydro - 1 - oxo - 6α - propyl - 3 - p-chlorophenyl - 1H - pyrrolo[1,2-c]imidazol - 2(3H)-yl)-1-thio-L-threo - α - D - galacto - octopyranoside having the following characteristics: $[α]_D$ +182° (c., 1.0, EtOH).

*Analysis.*—Calcd. for $C_{24}H_{34}Cl_2N_2O_5S$ (percent): C, 54.13; H, 6.39; Cl, 13.16; N, 5.26; S, 6.01. Found (percent): C, 54.80; H, 6.56; Cl, 13.64; N, 5.31; S, 5.77.

EXAMPLE 11

Methyl 7-chloro - 6,7,8 - trideoxy - 6 - (5,6,7,7aα-tetrahydro - 1 - oxo - 7α - propyl - 3 - p - nitrophenyl - 1H-pyrrolo[1,2-c]imidazol - 2(3H) - yl) - 1 - thio - L-threo-α-D-galacto-octopyranoside

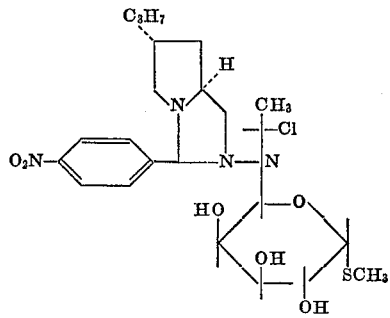

Following the procedure of Example 9, 3 g. of 1'-demethylclindamycin was treated with 4.5 g. of p-nitrobenzaldehyde. After chromatography (fractions 120–160 ml.) there was obtained 1.05 g. of methyl 7-chloro-6,7,8-trideoxy - 6 - (5,6,7,7aα - tetrahydro - 1 - oxo - 6α-propyl - 3 - p - nitrophenyl - 1H - pyrrolo[1,2-c]imidazol-2(3H) - yl) - 1 - thio-L-threo-α-D-galacto-octopyranoside having the following characteristics: $[α]_D$ +169° (c., 1.0, EtOH).

*Analysis.*—Calcd. for $C_{24}H_{34}ClN_3O_7S$ (percent): C, 53.04; H, 6.26; Cl, 6.44; N, 7.73; S, 5.89. Found (percent): C, 53.75; H, 6.43; Cl, 6.47; N, 8.10; S, 5.65.

Following the procedure of Examples 8 to 11, but substituting other substituted aromatic aldehydes such as salicylaldehyde, piperonal, and vanillin, there are obtained the corresponding compounds of Formula I wherein R is methyl, $R_1$ is propyl, and X is halogen or hydroxy as the case may be, and $R_2$ is 2-hydroxyphenyl, 3,4-methylenedioxyphenyl, or 4-hydroxy-3-methoxyphenyl.

EXAMPLE 12

Methyl 6,8-dideoxy - 7 - methoxy - 6 - (5,6,7,7aα-tetrahydro - 1 - oxo-6α- and β - propyl - 1H - pyrrolo[1,2-c]imidazol - 2(3H) - yl) - 1 - thio - L - threo-α-D-galacto-octopyranoside

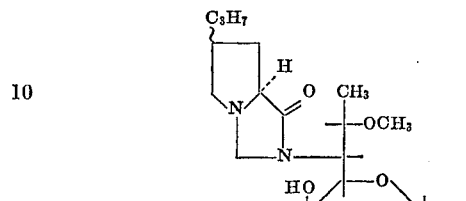

Part A–12

Methyl N-acetyl-6,7-aziridino-6-deamino-7-deoxy-2,3,4-tri-O-acetyl-α-thiolincosaminide

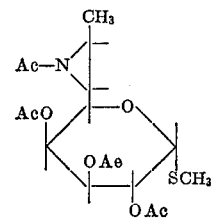

To a solution of 2.0 gms. of methyl 6,7-aziridino - 6-deamino - 7 - deoxy-α-thiolincosaminide in 20 ccs. of pyridine was added with stirring 10 ccs. of acetic anhydride and the reaction mixture left overnight at room temperature. The volatile material was removed as completely as possible from the reaction mixture on a rotary evaporator at 40° C./7 mm., finally at high vacuum, to a colorless solid. The resulting solid was dissolved in chloroform, stirred with aqueous cadmium chloride to remove the pyridine, filtered and the chloroform layer washed twice with water, and dried over anhydrous sodium sulfate. On removal of the solvent on the rotary evaporator at 40° C./7 mm. methyl N-acetyl - 6,7 - aziridino - 6-deamino - 7 - deoxy - 2,3,4 - tri-O-acetyl - α - thiolincosaminide was obtained as a colorless crystalline solid, weight 3.1 gms. Recrystallization from ethyl acetate-Skellysolve B (technical hexane) gave colorless prismatic needles having the following characteristics: M.P. 173.5–175° C. $[α]_D$ +222° (c., 0.912, $CHCl_3$).

*Analysis.*—Calcd. for $C_{17}H_{25}O_8NS$ (percent): C, 50.61; H, 6.25; N, 3.47; S, 7.95. Found (percent): C, 50.43; H, 6.33; N, 3.41 S, 8.31.

Mol. wt. calcd.: 403.45.
Found (mass spec.): 403.

Part B–12

Methyl N-acetyl-2,3,4-tri-O-acetyl-7-deoxy-7(S)-methoxy-α-thiolincosaminide

A mixture of 5 gms. of methyl-N-acetyl - 2,3,4 - O - triacetyl - 6,7 - aziridino - 6 - deamino - 7 - deoxy - α-thiolincosaminide, 50 ccs. methanol, and 5 ccs. glacial acetic acid was heated under gentle reflux in an oil bath at 130° C. for six hours. The solvent was removed from the colorless solution at 40° C./7 mm. on a rotary evaporator yielding a pale yellow syrup which crystallized. The crystals were taken up in methylene chloride solution, washed with saturated aqueous sodium bicarbonate, then with water, and then dried over anhydrous sodium sulfate. Removal of the solvent as above gave methyl N-acetyl - 2,3,4 - tri - O - acetyl - 7(S) - methoxy - 7-deoxy - α - thiolincosaminide as colorless crystals (5.31 gms.). Crystallization from ethyl acetate-Skellysolve B gave fine colorless needles having the following properties: M.P. 235–236° C. [α]_D +205° (c., 0.9952, CHCl_3).

Analysis.—Calcd. for $C_{18}H_{29}O_9NS$ (percent): C, 49.64; H, 6.71; N, 3.22; S, 7.36; OMe, 7.13. Found (percent): C, 49.77; H, 6.92; N, 3.65; S, 7.90; OMe, 7.38.

Mol. wt. calcd.: 435.49.

Found (mass spec.): 435.

On hydrazinolysis by the procedure of Part C–12 there is obtained methyl 7-deoxy-7(S)-methoxy-α-thiolincosaminide.

Part C–12

Methyl 7 - deoxy - 7(S) - methoxy - α - thiolincosaminide (methyl 6,8 - dideoxy - 7 - O - methyl - 6 - amino-1 thio - L - threo - α - D - galacto - octopyranoside)

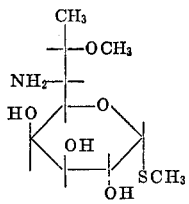

A solution of 3.2 gms. of methyl N-acetyl-2,3,4-tri-O-acetyl - 7 - deoxy-7(S)-methoxy-α-thiolincosaminide in 25 gms. of hydrazine hydrate was heated under gentle reflux with stirring in an oil-bath at 145° C. overnight. The solvent was removed from the colorless solution as completely as possible by distillation from an oil-bath at 100° C./15 mm. and finally at high vacuum to give methyl 7-deoxy-7(S)-methoxy-α-thiolincosaminide as a colorless syrup. The syrup was chromatographed on 750 gms. of silica gel in a 4.8×97 cm. column using 1 MeOH:10 CHCl_3 as the solvent system. After 1.4 liter forerun, 50 ml. fractions were collected. Fractions 281–600 were pooled and evaporated to dryness yielding 2.06 gms. methyl 7-deoxy-7(S)-methoxy-α-thiolincosaminide which on crystallization from acetonitrile yielded colorless needles having the following characteristics: M.P. 154–155° C. [α]_D +260° (c., 0.5635, H_2O).

Analysis.—Calcd. for $C_{10}H_{21}O_5NS$ (percent): C, 44.92; H, 7.92; N, 5.24; S, 12.00; OMe, 11.61. Found (percent): C, 45.20; H, 7.96; N, 5.08; S, 12.19; OMe, 11.86.

Mol. wt. calcd.: 267.35.

Found (mass spec.): 267.

Part D–12

1'-carbobenzoxy-7-deoxy-7(S)-methoxylincomycin D hydrochloride

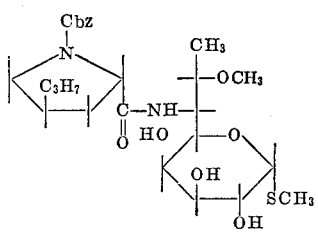

Cis and trans-1-carbobenzoxy-4-propyl-L-proline (2.33 g.) was dissolved in 150 ml. of acetonitrile containing 1.12 ml. of triethylamine. The solution was cooled to 0° and 1.18 ml. of isobutylchloroformate added. After 10 min. at 0°, a solution of 2.17 g. of methyl 7(S)-methoxy-α-thiolincosaminide in 40 ml. of water was added. The mixture was stirred for 2 hrs. at ambient temperature and the solvent distilled in vacuo to yield a crystalline residue.

The crystals were collected by filtration, washed and dried to yield methyl N-(1-carbobenzoxy-4-trans and cis-propyl-L-prolyl)-7(S)-methoxylincosaminide.

Part E–12

7-deoxy-7(S)-methoxylincomycin D hydrochloride and 7-deoxy - 7(S) - methoxyallolincomycin D hydrochloride (cis and trans forms)

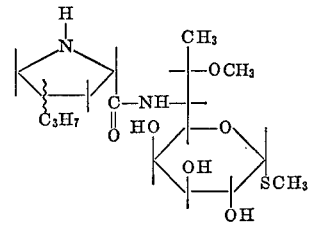

A portion of the crude product from above was dissolved in 50 ml. of methanol and 0.5 g. of 10% palladium on charcoal added. The mixture was shaken under 35 lbs. of hydrogen pressure for 4 hrs. TLC showed partial hydrogenolysis. An additional 0.5 g. of catalyst was added and hydrogenation continued for 18 hrs. The catalyst was removed by filtration. The residue was chromatographed over silica gel, and the more polar fraction collected. It weighed 185 mg. It was converted to the hydrochloride in the usual manner.

Part F–12

Methyl 6,8 - dideoxy - 7 - methoxy - 6 - (5,6,7,7aα-tetrahydro-1-oxo-6α- and β-propyl-1H-pyrrolo[1,2-c]-imidazol -2(3H)-yl)-1-thio-L-threo-α-D-galactooctopyranoside Following the procedure of Example 1 substituting the 1'-dimethylclindamycin hydrochloride by the mixed 7(S)-methoxylincomycin D hydrochloride and 7(S)-methoxyallolincomycin D hydrochloride of Part E–12, there is obtained methyl 6,8-dideoxy-7-methoxy-6-(5,6,7,7aα-tetra-2(3H)-yl)-1-thio-L-threo-α-D-galacto-octopyranoside.

By substituting the methanol in Part B–12 by ethanol or other loweralkanol the corresponding methyl 6,8-dideoxy-7-loweralkoxy - 6 - (5,6,7,7aα-tetrahydro - 1 - oxo-6α- and β-propyl - 1H - pyrrolo[1,2-c]imidazol-2(3H)-yl)-1-thio-L-threo-α-D-galacto-octopyranosides are obtained.

Following the procedure of Example 12 substituting in Part B–12 the methanol by methyl sulfide, 2-hydroxyethyl methyl sulfide, phenyl sulfide, ethyl sulfide, and isopropyl methyl sulfide, there are obtained methyl 6,7,8-trideoxy-7(S) - (methylthio)-, 7(S) - (ethylthio)-, 7(S)- (propylthio)-, 7(S)-(phenylthio)-, and 7(S)-(2-hydroxyethylthio) - 6 - 5,6,7,7aα - tetrahydro - 1 - oxo - 6α- and β - propyl - 1H - pyrrolo[1,2-c]imidazol - 2(3H) - yl)-1-thio-L-threo-α-D-galactooctopyranosides.

EXAMPLE 13

Methyl 7-chloro-6,7,8-trideoxy-6-(5,6,7,7aα-tetrahydro-1-oxo - 1H - pyrrolo[1,2-c]imidazol-2(3H)-yl)-1-thio-L-threo-α-D-galacto-octopyranoside

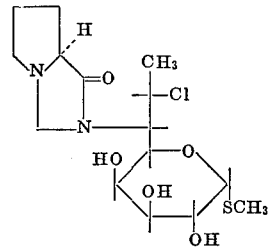

A mixture of 2.4 g. 7(S)-chloro-7-deoxy-4'-depropyl-lincomycin, 50 ml. water, 5 ml. formaldehyde, and 1 N NaOH to pH 10 was stirred for 2 hrs. The reaction mixture was extracted with chloroform and the chloroform extract evaporated to dryness yielding 0.8 g. of solid which on recrystallization from ethyl acetate gave 500 mg. of methyl 7-chloro-6,7,8-trideoxy-6-(5,6,7,7aα-tetrahydro-1-oxo-1H-pyrrolo[1,2-c]imidazol - 2(3H) - yl)-1-thio-L-threo-α-D-galacto-octopyranoside having a melting point of 190–191° C.

What is claimed is:

1. A process for making compounds of the formula

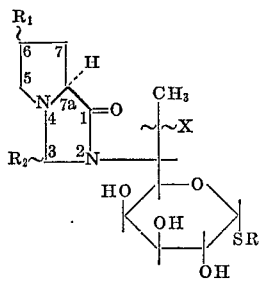

wherein R, R₁, R₂, and X are as given below which comprises reacting under non-acid conditions a compound of the formula

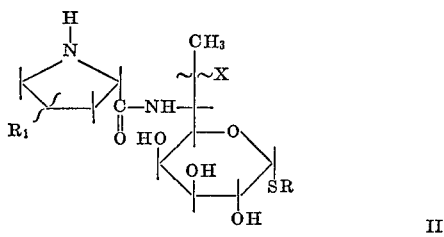

with an aldehyde of the formula R₂CHO wherein X is chlorine, bromine, iodine, hydroxy, loweralkoxy, hydroxyloweralkoxy, sulfhydryl, lower-alkylthio, hydroxyloweralkylthio, or an aromatic hydrocarbon-thio radical substituted by zero through 3 hydroxy, halo, nitro, dialkylamino groups containing in all not more than 12 carbon atoms; R is alkyl of one to 4 carbon atoms, inclusive; or a radical of the formula —CH₂CH₂—OR₃ wherein R₃ is hydrogen or alkyl of one to 4 carbon atoms, inclusive; R₁ is hydrogen or lower-alkyl; R₂ is hdyrogen or an aliphatic, cycloaliphatic hydrocarbon radical having from zero through three valences satisfied by halogen, alkoxy, alkenyloxy, alkylthio, alkenylthio, hydroxy, nitro, epoxy, epoxyalkoxy, alkanoyloxy, dialkylamino, carboxy, or lower carbalkoxy containing in all not more than 18 carbon atoms; or an aromatic hydrocarbon radical of the benzene series having from zero through three valences satisfied by hydroxy, alkoxy, alkanoyloxy, benzoyloxy, phenoxy, tolyloxy, halogen, nitro, amino, mercapto, alkylthio, amino, alkylamino, dialkylamino, or methylenedioxy containing in all not more than 18 carbon atoms; a hydrocarbon radical containing a heterocycle of the group furan, thiophene, pyridine, and indole having zero to three substituents of the group hydroxy, alkoxy, alkanoyloxy, benzyloxy, phenoxy, alkoxyphenyl, alkoxybenzyl, mercapto, alkylthio, phenylthio, benzylthio, halogen, nitro, amino, alkylamino, dialkylamino, carboxy, and carbalkoxy and containing in all not more than 18 carbon atoms.

2. A process of claim 1 wherein R₂ is an aliphatic or cycloaliphatic hydrocarbon radical having from zero through three valences satisfied by halogen, alkoxy, alkenyloxy, alkylthio, alkenylthio, hydroxy, mercapto, nitro, epoxy, epoxyalkoxy, alkanoyloxy, dialkylamino, carboxy, or carbalkoxy containing in all not more than 18 carbon atoms.

3. A process of claim 2 wherein R₂ is hydrogen.

4. A process of claim 2 wherein R₂ is lower alkyl.

5. A process of claim 3 wherein X is chlorine or bromine.

6. A process of claim 4 wherein X is chlorine or bromine.

7. A process of claim 1 in which R₂ is a hydrocarbon radical containing a heterocycle of the group furan, thiophene, pyridine, and indole having zero to three substituents of the group hydroxy, alkoxy, alkanoyloxy, benzyloxy, phenoxy, alkoxyphenyl, alkoxybenzyl, mercapto, alkylthio, phenylthio, benzylthio, halogen, nitro, amino, alkylamino, dialkylamino, carboxy, and carbalkoxy and containing in all not more than 18 carbon atoms.

8. A process of claim 7 in which R₂ is furyl.

9. A compound of the formula

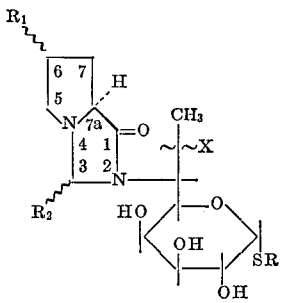

wherein X is chlorine, bromine, iodine, hydroxy, loweralkoxy, hydroxyloweralkoxy, sulfhydryl, lower-alkylthio, hydroxyloweralkylthio, or an aromatic hydrocarbon-thio radical substituted by zero through 3 hydroxy, halo, nitro, dialkylamino groups containing in all not more than 12 carbon atoms; R is alkyl of one to 4 carbon atoms, inclusive; or a radical of the formula —CH₂CH₂—OR₃ wherein R₃ is hydrogen or alkyl of one to 4 carbon atoms, inclusive; R₁ is hydrogen or lower-alkyl; R₂ is hydrogen or an aliphatic, cycloaliphatic hydrocarbon radical having from zero through three valences satisfied by halogen, alkoxy, alkenyloxy, alkylthio, alkenylthio, hydroxy, mercapto, nitro, epoxy, epoxyalkoxy, alkanoyloxy, dialkylamino, carboxy, or lower carbalkoxy containing in all not more than 18 carbon atoms; or an aromatic hydrocarbon radical of the benzene series having from zero through three valences satisfied by hydroxy, alkoxy, alkanoyloxy, benzyloxy, phenoxy, tolyloxy, halogen, nitro, amino, mercapto, alkylthio, alkylamino, dialkylamino, or methylenedioxy containing in all not more than 18 carbon atoms; a hydrocarbon radical containing a heterocycle of the group furan, thiophene, pyridine, and indole having zero to three substituents of the group hydroxy, alkoxy, alkanoyloxy, benzyloxy, phenoxy, alkoxyphenyl, alkoxybenzyl, mercapto, alkylthio, phenylthio, benzylthio, halogen, nitro, amino, alkylamino, dialkylamino, carboxy, and carbalkoxy and containing in all not more than 18 carbon atoms.

10. A compound of claim 9 wherein R₂ is an aliphatic or cycloaliphatic hydrocarbon radical having from zero through three valences satisfied by halogen, alkoxy, alkenyloxy, alkylthio, alkenylthio, hydroxy, mercapto, nitro, epoxy, epoxyalkoxy, alkanoyloxy, dialkylamino, carboxy, or carbalkoxy containing in all not more than 18 carbon atoms.

11. A compound of claim 9 wherein R₂ is hydrogen.

12. A compound of claim 10 wherein R₂ is lower alkyl.

13. A compound of claim 10 wherein X is chlorine or bromine.

14. A compound of claim 11 wherein X is chlorine or bromine.

15. A compound of claim 12 wherein X is chlorine or bromine.

16. A compound of claim 9 in which R₂ is a hydrocarbon radical containing a heterocycle of the group furan, thiophene, pyridine, and indole having zero to three substituents of the group hydroxy, alkoxy, alkanoyloxy, benzyloxy, phenoxy, alkoxyphenyl, alkoxybenzyl, mercapto, alkylthio, phenylthio, benzylthio, halogen, nitro, amino, alkylamino, dialkylamino, carboxy, and carbalkoxy and containing in all not more than 18 carbon atoms.

17. A compound of claim 16 in which R₂ is furyl.

18. A compound of claim 14, methyl 7-chloro-6,7,8-trideoxy - 6 - (5,6,7,7aα - tetrahydro - 1 - oxo - 6α - propyl - 1H - pyrrolo[1,2 - c]imidazol - 2(3H) - yl) - 1 - thio-L-threo-α-D-galacto-octopyranoside.

19. A compound of claim 14, methyl 7-chloro-6,7,8-trideoxy - 6 - (5,6,7,7aα - tetrahydro - 1 - oxo - 6α - pentyl - 1H - pyrrolo[1,2 - c]imidazol - 2(3H) - yl) - 1 - thio-L-threo-α-D-galacto-octopyranoside.

20. A compound of claim 14, methyl 7-bromo-6,7,8-trideoxy - 6 - (5,6,7,7aα - tetrahydro - 1 - oxo-6α - propyl-1H - pyrrolo[1,2 - c]imidazol - 2(3H) - yl) - 1 - thio - L-threo-α-D-galacto-octopyranoside.

References Cited
UNITED STATES PATENTS
3,284,439  11/1966  Argoudelis _____ 260—210 R LEWIS GOTTS, Primary Examiner J. R. BROWN, Assistant Examiner U.S. Cl. X.R.
260—999